US012705133B2

(12) United States Patent
Gunasekaran et al.

(10) Patent No.: US 12,705,133 B2
(45) Date of Patent: Aug. 11, 2026

(54) DATA ROUTING FOR ERROR CORRECTION IN STACKED MEMORY ARCHITECTURES

(71) Applicant: Micron Technology, Inc., Boise, ID (US)

(72) Inventors: Shivasankar Gunasekaran, Erie, CO (US); Sai Krishna Mylavarapu, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 91 days.

(21) Appl. No.: 18/777,165

(22) Filed: Jul. 18, 2024

(65) Prior Publication Data

US 2025/0147843 A1 May 8, 2025
US 2025/0377973 A2 Dec. 11, 2025

Related U.S. Application Data

(60) Provisional application No. 63/547,083, filed on Nov. 2, 2023.

(51) Int. Cl.
*G06F 11/10* (2006.01)

(52) U.S. Cl.
CPC ...... *G06F 11/1048* (2013.01); *G06F 11/1068* (2013.01)

(58) Field of Classification Search
None
See application file for complete search history.

(56) References Cited

U.S. PATENT DOCUMENTS 11,329,673 B1 * 5/2022 Hanna ................. G06F 11/1004
2005/0028056 A1 2/2005 Tsao et al.
2013/0003480 A1 1/2013 D'Abreu et al.
2014/0006901 A1 1/2014 Moon et al.
2014/0337688 A1 * 11/2014 Billing .................. G11C 29/44 714/764
2016/0357630 A1 12/2016 Kang et al.
(Continued)

OTHER PUBLICATIONS

"International Search Report and Written Opinion of the International Searching Authority," issued in connection with Int'l Appl. No. PCT/US2024/039164, dated Nov. 6, 2024 (11 pages).

*Primary Examiner* — Daniel F. McMahon
(74) *Attorney, Agent, or Firm* — Holland & Hart LLP

(57) ABSTRACT

Methods, systems, and devices for data routing for error correction in stacked memory architectures are described. A system supports error correction of bits of data communicated between a first semiconductor die (e.g., an array die) and a second semiconductor die (e.g., a logic die). For example, an interface of the second semiconductor die receives data stored at a memory array of the first semiconductor die. The interface includes error correction engines each operable to correct one or more bit errors. The interface also includes logic circuitry operable to route physically-grouped subsets of the received data to respective error correction engines, and such subsets are configured to allocate the error correction engines in manner that improves a likelihood that physically-grouped errors in the system can be corrected. The interface outputs the data to a host system after the error control operations are performed.

29 Claims, 8 Drawing Sheets

(56) References Cited

U.S. PATENT DOCUMENTS

| | | | | |
|---|---|---|---|---|
| 2017/0123896 | A1 | 5/2017 | Baek et al. | |
| 2017/0147432 | A1* | 5/2017 | Suh | G06F 3/064 |
| 2019/0012230 | A1* | 1/2019 | Chung | G06F 11/1048 |
| 2022/0066867 | A1* | 3/2022 | Schaefer | G11C 7/1006 |
| 2024/0111627 | A1* | 4/2024 | Schaefer | H03M 13/05 |

* cited by examiner

DATA ROUTING FOR ERROR CORRECTION IN STACKED MEMORY ARCHITECTURES

CROSS REFERENCE

The present Application for Patent claims priority to and the benefit of U.S. Patent Application No. 63/547,083 by Gunasekaran et al., entitled "DATA ROUTING FOR ERROR CORRECTION IN STACKED MEMORY ARCHITECTURES," filed Nov. 2, 2023, which is assigned to the assignee hereof, and which is expressly incorporated by reference in its entirety herein.

TECHNICAL FIELD

The following relates to one or more systems for memory, including data routing for error correction in stacked memory architectures.

BACKGROUND

Memory devices are used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored by the memory cell. To store information, a memory device may write (e.g., program, set, assign) states to the memory cells. To access stored information, a memory device may read (e.g., sense, detect, retrieve, determine) states from the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells in a non-volatile configuration may maintain stored logic states for extended periods of time even in the absence of an external power source. Memory cells in a volatile configuration may lose stored states when disconnected from an external power source.

DETAILED DESCRIPTION

Figure 1:
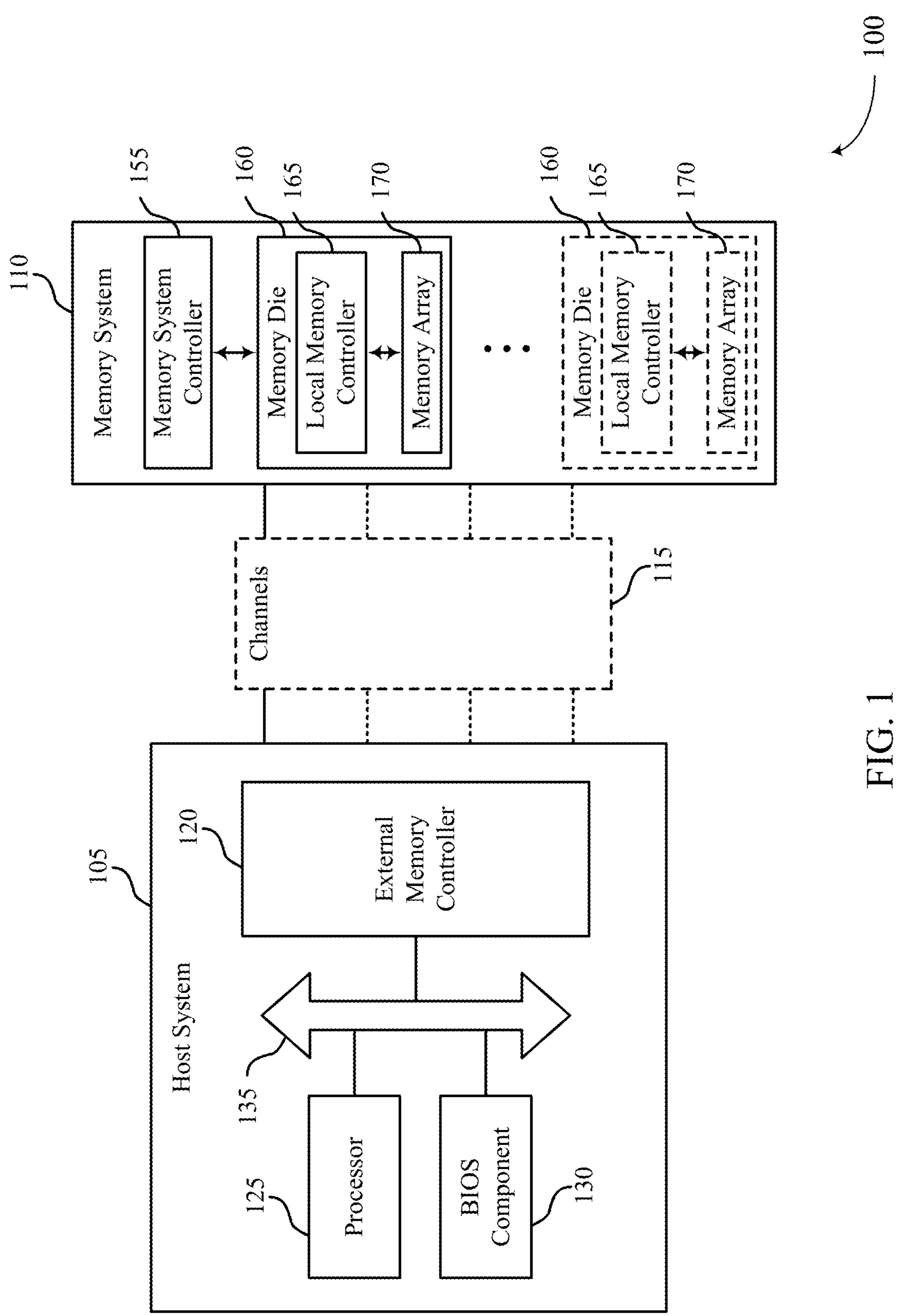
FIG. 1 shows an example of a system that supports data routing for error correction in stacked memory architectures in accordance with examples as disclosed herein.

Some memory systems may include a stack of semiconductor dies, including one or more memory dies (e.g., array dies) stacked with a logic die that is operable to access a set of memory arrays distributed across the one or more memory dies. Such a stacked architecture may be implemented as part of a coupled dynamic random access memory (DRAM) system, and may support solutions for memory-centric logic, such as graphics processing units (GPUs), among other implementations. In some examples, a 3D stacked memory system may be closely coupled (e.g., physically coupled, electrically coupled, directly-coupled) with a processor, such as a GPU or other host, as part of a physical memory map accessible to the processor. Such coupling may include one or more processors being implemented in the same semiconductor die as at least a portion of a 3D stacked memory system (e.g., as part of a logic die), or one or more processors being implemented in a die that is directly coupled (e.g., fused) with another die that includes at least a portion of a 3D stacked memory system, or otherwise coupled with another die that includes at least a portion of a 3D stacked memory system (e.g., via a silicon interposer or other intervening component). Unlike cache-based memory, a 3D stacked memory system may not be backed by a level of external memory with the same physical addresses. For example, a 3D stacked memory system may be associated with and located within a dedicated base address, where each portion of the 3D stacked memory system may be non-overlapping within the address.

In some systems that implement a stack of semiconductor dies, such as a 3D stacked memory system, memory access circuitry may be distributed among (e.g., across, between) multiple semiconductor dies. For instance, multiple semiconductor dies of such a system may include a stack of semiconductor dies (e.g., a stack of multiple directly-coupled semiconductor dies), including one or more first semiconductor dies (e.g., array dies) that each include one or more memory arrays and a second semiconductor die (e.g., a logic die) that is operable to access the one or more memory arrays. In some implementations, an interface of a logic die may support error detection and correction of bits of data received from a memory array of an array die. For example, the interface of the logic die may use an error correction code (ECC) (e.g., a Reed-Solomon code) to correct one or more bit errors detected in the received data. In some cases, bits of the received data may be organized into (e.g., received as) blocks of bits (e.g., symbols). In some cases, the quantity of errors correctable using a given ECC may be limited by physical grouping of errors, such as a quantity of blocks (e.g., rather than a quantity of bits). For example, if each block includes eight bits and an interface uses an ECC code capable of correcting one block of received data, the interface may be able to correct up to all eight bits in one block. However, the interface may be unable to correct bit errors in multiple blocks of the received data, even if the total quantity bits to be corrected is less than the quantity of bits included in a given block (e.g., if one bit in each of two blocks has an error).

In accordance with examples as described herein, a system may be configured to support routing of data retrieved from a memory array in physically-arranged groups to improve error correction capabilities of the system. For example, an interface of a logic die may include error correction engines (e.g., ECC engines) that are each operable to correct one or more bit errors. The interface may also include logic circuitry operable to route subsets of data received from a memory array of an array die to respective error correction engines of the interface. For example, the logic circuitry may route a first subset of the received data to a first error correction engine and a second subset of the received data to a second error correction engine, and the first and second error correction engines may perform one or more error control operations (e.g., error detection operations, error correction operations) on the respectively received subsets of data. The logic circuitry may route subsets of data to respective error correction engines in accordance with physical arrangements of memory arrays or access circuitry, such as routing subsets of data in accordance with a quantity of columns included in a column set of the memory array (e.g., such that errors in at least one column set associated with the received data may be correctable by the error correction engines). Implementing data routing and error correction in accordance with the described techniques may support more reliable data accessing and reduced likelihood of uncorrectable errors, such as by allocating error control capabilities in accordance with physical groupings of array access (e.g., physical groupings applicable to 3D stacked memory or other multiple-die implementations) that may be relatively more likely to collectively experience errors, among other benefits.

Features of the disclosure are illustrated and described in the context of systems and dies. Features of the disclosure are further illustrated and described in the context of an interface architecture, systems, a block diagram, and flowcharts.

FIG. 1 shows an example of a system 100 that supports data routing for error correction in stacked memory architectures in accordance with examples as disclosed herein. The system 100 may include portions of an electronic device, such as a computing device, a mobile computing device, a wireless communications device, a graphics processing device, a vehicle, or other systems. The system 100 includes a host system 105, a memory system 110, and one or more channels 115 coupling the host system 105 with the memory system 110 (e.g., to provide a communicative coupling). The system 100 may include one or more memory systems 110, but aspects of the one or more memory systems 110 may be described in the context of a single memory system 110.

The host system 105 may be an example of a processing system (e.g., circuitry, one or more processors, an application processing system, processing circuitry, one or more processing components) that uses memory to execute processes (e.g., applications, functions, computations), such as a processing system of a computing device, a mobile computing device, a wireless communications device, a graphics processing device, a wearable device, an internet-connected device, a vehicle controller, a system on a chip (SoC), or other stationary or portable electronic device, among other examples. The host system 105 may include one or more of an external memory controller 120, a processor 125, a basic input/output system (BIOS) component 130, or other components (e.g., a peripheral component, an input/output controller, not shown). The components of the host system 105 may be coupled with one another using a bus 135.

An external memory controller 120 may be configured to enable communication of information (e.g., data, commands, control information, configuration information) between components of the system 100 (e.g., between components of the host system 105, such as the processor 125, and the memory system 110). For example, an external memory controller 120 may generate commands (e.g., in response to or to otherwise support an application of the host system 105) to write data to a memory system 110, or to read data from the memory system 110, or to otherwise communicate with a memory system 110. An external memory controller 120 may process (e.g., convert, translate) communications exchanged between the host system 105 and the memory system 110. In some examples, an external memory controller 120, or other component of the system 100, or associated functions described herein, may be implemented by or be part of the processor 125. For example, an external memory controller 120 may be hardware, firmware, or software (e.g., instructions), or some combination thereof implemented by a processor 125 or other component of the system 100 or the host system 105. Although an external memory controller 120 is illustrated outside the memory system 110, in some examples, an external memory controller 120, or its functions described herein, may be implemented by one or more components of a memory system 110 (e.g., a memory system controller 155, a local memory controller 165) or vice versa. In various examples, the host system 105 or an external memory controller 120 may be referred to as a host.

A processor 125 may be operable to provide functionality (e.g., control functionality, processing functionality) for the system 100 or the host system 105. A processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination thereof (e.g., as one or more processing components that are configured individually or collectively to support an application of the host system 105). In some examples, a processor 125 may be an example of a central processing unit (CPU), a graphics processing unit (GPU), a general-purpose GPU (GPGPU), or an SoC, among other examples.

In some examples, the system 100 or the host system 105 may include an input component, an output component, or a combination thereof. Input components may include a sensor, a microphone, a keyboard, another processor (e.g., on a printed circuit board), an interface (e.g., a user interface, an interface between other devices), or a peripheral that interfaces with system 100 via one or more peripheral components, among other examples. Output components may include a display, audio speakers, a printing device, another processor on a printed circuit board, or a peripheral that interfaces with the system 100 via one or more peripheral components, among other examples.

The memory system 110 may be a component of the system 100 that is operable to provide physical memory locations (e.g., addresses) that may be used or referenced by the system 100 (e.g., by the host system 105). The memory system 110 may include a memory system controller 155 and one or more memory dies 160 (e.g., memory chips) to support a capacity for data storage. The memory system 110 may be configurable to work with one or more different types of host systems 105, and may respond to and execute commands provided by the host system 105 (e.g., via an external memory controller 120). For example, the memory system 110 (e.g., a memory system controller 155) may receive a write command indicating that the memory system 110 is to store data received from the host system 105, or receive a read command indicating that the memory system 110 is to provide data stored in a memory die 160 to the host system 105, or receive a refresh command indicating that the memory system 110 is to refresh data stored in a memory die 160, among other types of commands and operations.

A memory system controller 155 may include components (e.g., circuitry, logic, instructions) operable to control operations of the memory system 110. A memory system controller 155 may include hardware, firmware, or instructions that enable the memory system 110 to perform various operations, and may be operable to receive, transmit, or execute commands, data, or control information related to operations of the memory system 110. A memory system controller 155 may be operable to communicate with one or more of an external memory controller 120, one or more memory dies 160, or a processor 125. In some examples, a memory system controller 155 may control operations of the memory system 110 in cooperation with a local memory controller 165 of a memory die 160.

Each memory die 160 may include one or more local memory controllers 165 and one or more memory arrays 170. A memory array 170 may be a collection of memory cells, with each memory cell being operable to store one or more bits of data. A memory array 170 may include a two-dimensional (2D) array of memory cells, or a three-dimensional (3D) array of memory cells. In some examples, a two-dimensional (2D) memory die 160 may include a single memory array 170. In some examples, a three-dimensional (3D) memory die 160 may include two or more memory arrays 170, which may be stacked or positioned beside one another (e.g., relative to a substrate).

A local memory controller 165 may include components (e.g., circuitry, logic, instructions) operable to control operations of a memory die 160. In some examples, a local memory controller 165 may be operable to communicate (e.g., receive or transmit data or commands or both) with a memory system controller 155. In some examples, a memory system 110 may not include a memory system controller 155, and a local memory controller 165 or an external memory controller 120 may perform various functions described herein. As such, a local memory controller 165 may be operable to communicate with a memory system controller 155, with other local memory controllers 165, or directly with an external memory controller 120, or a processor 125, or any combination thereof. Examples of components that may be included in a memory system controller 155 or a local memory controller 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, sense components for sensing states of memory cells of a memory array 170, write components for writing states to memory cells of a memory array 170, or various other components operable for supporting described operations of a memory system 110.

A host system 105 (e.g., an external memory controller 120) and a memory system 110 (e.g., a memory system controller 155) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, an electrically conductive path) between terminals associated with the components of the system 100. For example, a channel 115 may be associated with a first terminal (e.g., including one or more pins, including one or more pads) at the host system 105 and a second terminal at the memory system 110. A terminal may be an example of a conductive input or output point of a device of the system 100, and a terminal may be operable to act as part of a channel 115. In some implementations, at least the channels 115 between a host system 105 and a memory system 110 may include or be referred to as a host interface (e.g., a physical host interface). In some implementations, a host interface may include or be associated with interface circuitry (e.g., signal drivers, signal latches) at the host system 105 (e.g., at an external memory controller 120), or at the memory system 110 (e.g., at a memory system controller 155), or both.

In some examples, a channel 115 (e.g., associated signal paths and terminals) may be dedicated to communicating one or more types of information. For example, the channels 115 may include one or more command and address channels, one or more clock signal channels, one or more data channels, among other channels or combinations thereof. In some examples, signaling may be communicated via the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols of a signal may be registered for each clock cycle (e.g., on both a rising edge and a falling edge of a clock signal).

In some examples, at least a portion of the system 100 may implement a stacked die architecture in which multiple semiconductor dies are physically and communicatively coupled. In some such implementations, circuitry for accessing one or more memory arrays 170 (e.g., circuitry of a memory system 110) may be distributed among multiple semiconductor dies of a stack (e.g., a stack of multiple directly-coupled semiconductor dies). For example, a first die (e.g., a logic die) may include a set of multiple first interface blocks (e.g., memory interface blocks, instances of first interface circuitry) and one or more second dies (e.g., array dies) may include corresponding second interface blocks, each coupled with a first interface block of the first die. Each first interface block may be configured to access one or more memory arrays of the second dies. In some examples, the system 100 may include a controller (e.g., a memory controller, a host interface controller, at least a portion of an external memory controller 120) for each set of one or more first interface blocks to support access operations (e.g., to access one or more memory arrays 170) via the set of first interface blocks. In some examples, such controllers may be located in the same first die as the first interface blocks.

In accordance with examples described herein, a system 100 may be configured to support routing of data to error correction engines of a first interface block to improve error correction capabilities of the system 100. For example, first interface blocks of a logic die may support error correction of data received from memory arrays of the coupled array dies (e.g., via corresponding second interface blocks). The received data may include a set of blocks (e.g., symbols) of bits, where the blocks may be associated with a physical arrangement of the memory arrays or corresponding access circuitry. The first interface blocks may implement (e.g., use) ECC circuitry that supports the correction of bits included in one or more blocks of bits. The first interface blocks may also include logic circuitry that routes subsets of the received data to respective error correction engines of the first interface block, for example, such that bit errors in at least one column set of the memory array may be corrected. Implementing data routing and error correction in accordance with the described techniques may support more reliable data accessing and reduced likelihood of uncorrectable errors, such as by allocating error control capabilities in accordance with physical groupings of array access (e.g., physical groupings applicable to 3D stacked memory or other multiple-die implementations) that may be relatively more likely to collectively experience errors, among other benefits.

In addition to applicability in systems as described herein, data routing for error correction in a stacked memory architecture may be generally implemented to support artificial intelligence or machine learning applications, among other types of computationally-intensive applications. As the use of artificial intelligence increases to support machine learning, analytics, decision making, or other related applications, electronic devices that support artificial intelligence applications and processes may be desired. For example, artificial intelligence applications may be associated with accessing relatively large quantities of data for analytical purposes and may benefit from memory systems capable of effectively and efficiently storing relatively large quantities of data or accessing stored data relatively quickly. Implementing the techniques described herein may support artificial intelligence and machine learning techniques by increasing a speed and reliability of accessing stored data and reducing a likelihood that accessed data is associated with an uncorrectable error by allocating error correction capabilities in accordance with physical groupings or memory arrays and access circuitry associated with such high-performance closely-coupled memory systems, among other benefits.

Figure 2:
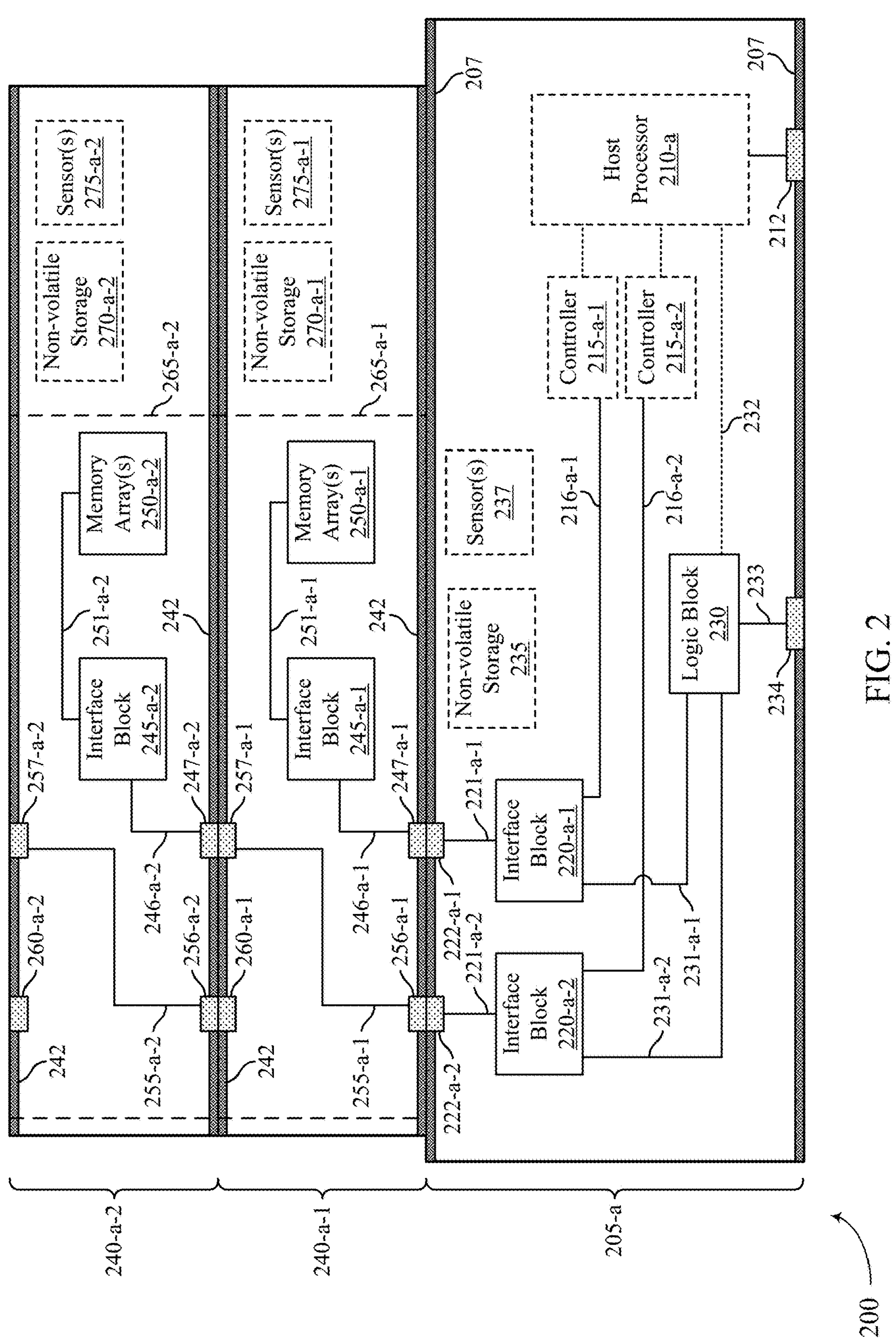
FIG. 2 shows an example of a system that uses data routing for error correction in stacked memory architectures in accordance with examples as disclosed herein.

FIG. 2 shows an example of a system 200 (e.g., a semiconductor system, a system of coupled semiconductor dies, a 3D stacked memory system) that uses data routing for error correction in stacked memory architectures in accordance with examples as disclosed herein. The system 200 illustrates an example of a die 205 (e.g., a die 205-*a*, a semiconductor die, a logic die, a processor die, a host die) that is coupled with one or more dies 240 (e.g., dies 240-*a*-1 and 240-*a*-2, semiconductor dies, memory dies, array dies). A die 205 or a die 240 may be formed using a respective semiconductor substrate (e.g., a substrate of crystalline semiconductor material such as silicon, germanium, silicon-germanium, gallium arsenide, or gallium nitride), or a silicon-on-insulator (SOI) substrate (e.g., silicon-on-glass (SOG), silicon-on-sapphire (SOS)), or epitaxial semiconductor materials formed on another substrate, among other examples. Although the illustrated example of a system 200 includes two dies 240, a system 200 in accordance with the described techniques may include any quantity of one or more dies 240 coupled with a die 205, among other dies of a stack or other coupled layout. Further, although non-limiting examples of the system 200 herein are generally described in terms of applicability to memory systems, memory sub-systems, memory devices, or a combination thereof, examples of the system 200 are not so limited. For example, aspects of the present disclosure may be applied as well to any computing system, computing sub-system, processing system, processing sub-system, component, device, structure, or other types of systems or sub-systems used for applications such as data collecting, data processing, data storage, networking, communication, power, artificial intelligence, system-on-a-chip, control, telemetry, sensing and monitoring, digital entertainment, or any combination thereof.

The system 200 illustrates an example of interface circuitry between a host and memory (e.g., via a host interface, via a physical host interface) that is implemented in (e.g., divided between) multiple semiconductor dies (e.g., a stack of directly-coupled dies). For example, the die 205-*a* may include a set of one or more interface blocks 220 (e.g., interface blocks 220-*a*-1 and 220-*a*-2, memory interface blocks), and each die 240 may include a set of one or more interface blocks 245 (e.g., access interface blocks) and one or more memory arrays 250 (e.g., die 240-*a*-1 including an interface block 245-*a*-1 coupled with a set of one or more memory arrays 250-*a*-1, die 240-*a*-2 including an interface block 245-*a*-2 coupled with a set of one or more memory arrays 250-*a*-2). The memory arrays 250 may be examples of memory arrays 170, and may include memory cells of various architectures, such as RAM, DRAM, SDRAM, SRAM, FeRAM, MRAM, RRAM, PCM, chalcogenide, NOR, or NAND memory cells, or any combination thereof.

Although the example of system 200 is illustrated with one interface block 245 included in each die 240, a die 240 in accordance with the described techniques may include any quantity of one or more interface blocks 245, each coupled with a respective set of one or more memory arrays 250, and each coupled with a respective interface block 220 of a die 205. Thus, the interface circuitry of a system 200 may include one or more interface blocks 220 of a die 205, with each interface block 220 being coupled with (e.g., in communication with) a corresponding interface block 245 of a die 240 (e.g., external to the die 205). In some examples, a coupled combination of an interface block 220 and an interface block 245 (e.g., coupled via a bus associated with one or more channels, such as one or more data channels, one or more control channels, one or more clock channels, one or more pseudo-channels, or a combination thereof) may include or be referred to as a data path associated with a respective set of one or more memory arrays 250.

In some implementations, a die 205 may include a host processor 210. A host processor 210 may be an example of a host system 105, or a portion thereof (e.g., a processor 125, aspects of an external memory controller 120, or both). The host processor 210 may be configured to perform operations that implement storage of the memory arrays 250 (e.g., to support an application or other function of a host system 105, which may request access of the memory arrays 250). For example, the host processor 210 may receive data read from the memory arrays 250, or may transmit data to be written to the memory arrays 250, or both (e.g., in accordance with an application or other operations of the host processor 210). Additionally, or alternatively, a host processor 210 may be external to a die 205, such as in another semiconductor die or other component that is coupled with (e.g., communicatively coupled with, directly coupled with, bonded with, coupled via another intervening component) the die 205 via one or more contacts 212 (e.g., externally-accessible terminals of the system 200).

A host processor 210 may be configured to communicate (e.g., transmit, receive) signaling with the interface blocks 220 via one or more host interfaces 216 (e.g., physical host interfaces), which may implement aspects of channels 115 described with reference to FIG. 1. In some examples, host interfaces 216 may provide a communicative coupling between physical or functional boundaries of a host system 105 and a memory system 110. For example, the host processor 210 may be configured to transmit access signaling (e.g., control signaling, access command signaling, configuration signaling) via one or more host interfaces 216, which may be received by the interface blocks 220 to support access operations (e.g., read operations, write operations) on the memory arrays 250, among other operations. In some examples, a host interface 216 may include a respective set of one or more signal paths for each interface block 220, such that the host processor 210 may communicate with each interface block 220 via its corresponding set of signal paths (e.g., in accordance with a selection of the corresponding set to perform access operations via an interface block 220 that is selected by the host processor 210). Additionally, or alternatively, a host interface 216 may include one or more signal paths that are shared among multiple interface blocks 220 (not shown), and an interface block 220, or a host processor 210, or both may interpret, ignore, respond to, or inhibit response to signaling via shared signal paths of the host interface 216 based on a logical indication (e.g., an addressing indication associated with the interface block 220, an interface enable signal, or an interface select signal, which may be provided by the host processor 210 or the corresponding interface block 220, depending on signaling direction).

In some examples, a respective host interface 216 may be coupled between a set of one or more interface blocks 220 and a respective controller 215 (e.g., host interface 216-*a*-1 coupled between interface block 220-*a*-1 and controller 215-*a*-1, host interface 216-*a*-2 coupled between interface block 220-*a*-2 and controller 215-*a*-2, host interface controllers, host memory controllers). Each controller 215 (e.g., controllers 215-*a*-1 and 215-*a*-2) may be an example of control circuitry (e.g., memory controller circuitry, host interface control circuitry) associated with a host system 105, and may be associated with implementing respective instances of one or more aspects of an external memory controller 120, or of a memory system controller 155, or a combination thereof. A controller 215 and one or more corresponding interface blocks 220 and may communicate (e.g., collaborate) to perform one or more operations (e.g., scheduling operations, access operations, operations initiated by a host processor 210) associated with accessing a corresponding set of one or more memory arrays 250. For example, each controller 215 (e.g., controllers 215-*a*-1 and 215-*a*-2) may be operable to respond to indications (e.g., requests, commands) from the host processor 210 to access one or more memory arrays 250 in support of a function or application of the host processor 210, to transmit associated commands to one or more interface blocks 220 to access the one or more memory arrays 250, and to communicate data (e.g., write data, read data) with the host processor 210, among other functions.

In some examples, one or more controllers 215 (e.g., controllers 215-*a*-1 and 215-*a*-2) may be implemented in a die 205 (e.g., the same die that includes one or more interface blocks 220) whether a host processor 210 is included in the die 205, or is external to the die 205, and an interface block 220 may communicate with the host processor 210 via one or more controllers 215. In some other examples, controllers 215 or associated circuitry or functionality may be implemented external to a die 205 (e.g., in another die, not shown, coupled with respective interface blocks 220 via respective terminals for each of the respective host interfaces 216), which may be in the same die as or a different die from a die that includes a host processor 210. In some other examples, aspects of one or more controllers 215 may be included in the host processor 210 (e.g., as a memory interface of the host processor 210, as a memory interface of a host system 105).

Although the example of system 200 is illustrated as including a controller 215 for each interface block 220 (e.g., controller 215-*a*-1 for interface block 220-*a*-1, controller 215-*a*-2 for interface block 220-*a*-2), in various examples, a controller 215 may be coupled with any quantity of one or more interface blocks 220. Additionally, or alternatively, a given interface block 220 may be operable based on a single controller 215, or by one or more of a set of multiple controllers 215 (e.g., in accordance with a controller multiplexing scheme). In some examples, a controller 215, or a host interface 216, or both may be associated with a "channel set" that corresponds to multiple memory arrays 250. For example, such a channel set may be associated with multiple memory arrays 250 accessed via a single interface block 245, or multiple memory arrays 250 each accessed via a respective one of the interface blocks 245, or multiple memory arrays 250 each accessed via a respective one of the interface blocks 220, any of which may be associated with signaling via a single host interface 216 or a single controller 215. These and other configurations for implementing a channel sets may support various techniques for parallelism and high bandwidth data transfer, memory management operations, repair and replacement techniques, power and thermal distribution, among other techniques that leverage the described coupling of components and interfaces among multiple semiconductor dies (e.g., in accordance with the closely-coupled configuration of the system 200).

In some examples, a host processor 210 may determine to access an address (e.g., a logical address of a memory array 250, a physical address of a memory array 250, an address of an interface block 220, an address of a host interface 216, in response to an application of or supported by the host processor 210), and determine which controller 215 to transmit access signaling to for accessing the address (e.g., a controller 215 or interface block 220 corresponding to the address). In some examples, the address may be associated with a row of memory cells of the memory array 250, a column of memory cells of the memory array 250, or both. The host processor 210 may transmit access signaling (e.g., one or more access signals, one or more access commands) to the determined controller 215 and, in turn, the determined controller 215 may transmit access signaling to the corresponding interface block 220. The corresponding interface block 220 may subsequently transmit access signaling to the coupled interface block 245 to access the determined address (e.g., of a corresponding memory array 250).

A die 205 may also include a logic block 230 (e.g., a shared logic block, a central logic block, common logic circuitry, configuration circuitry, management circuitry, evaluation circuitry), which may be configured to communicate (e.g., transmit, receive) signaling with at least the interface blocks 220 of the die 205. In some cases, a logic block 230 may be configured to communicate information (e.g., commands, instructions, indications, data) with one or more interface blocks 220 to facilitate operations of the system 200. For example, a logic block 230 may be configured to transmit configuration signaling (e.g., initialization signaling, evaluation signaling, mapping signaling), which may be received by interface blocks 220 to support configuration of the interface blocks 220 or other aspects of operating the dies 240 (e.g., via the respective interface blocks 245). A logic block 230 may be coupled with each interface block 220 via a respective bus 231 (e.g., bus 231-*a*-1 associated with the interface block 220-*a*-1, bus 231-*a*-2 associated with the interface block 220-*a*-2). In some examples, respective buses 231 may each include a respective set of one or more signal paths, such that a logic block 230 may communicate with each interface block 220 via the respective set of signal paths. Additionally, or alternatively, respective buses 231 may include one or more signal paths that are shared among multiple interface blocks 220 (not shown).

In some implementations, a logic block 230 may be configured to communicate (e.g., transmit, receive) signaling with a host processor 210 (e.g., via a bus 232, via a contact 212 for a host processor 210 external to a die 205) such that the logic block 230 may support an interface between the interface blocks 220 and the host processor 210. For example, a host processor 210 may be configured to transmit initialization signaling (e.g., boot commands), or other configuration or operational signaling, which may be received by a logic block 230 to support initialization, configuration, evaluation, or other operations of the interface blocks 220. Additionally, or alternatively, in some implementations, a logic block 230 may be configured to communicate (e.g., transmit, receive) signaling with a component outside the system 200 via a bus 233 (e.g., and via a contact 234, which may be an externally-accessible terminal), such that the logic block 230 may support an interface that bypasses a host processor 210. Additionally, or alternatively, a logic block 230 may communicate with a host processor 210, and may communicate with one or more memory arrays 250 of one or more dies 240 (e.g., to perform self-test operations for access of memory arrays 250). In some examples, such implementations may support evaluations, configurations, or other operations of the system 200, via one or more contacts 234 that are accessible at a physical interface of the system, during manufacturing, assembly, validation, or other operation associated with the system 200 (e.g., before coupling with a host processor 210, without implementing a host processor 210, for operations independent of a host processor). Additionally, or alternatively, a logic block 230 may implement one or more aspects of a controller 215. For example, a logic block 230 may include or operate as one or more controllers 215 and may perform operations ascribed to a controller 215.

Each interface block 220 may be coupled with at least a respective bus 221 of the die 205, and a respective bus 246 of a die 240, that are configured to communicate signaling with a corresponding interface block 245 (e.g., via one or more associated signal paths). For example, the interface block 220-*a*-1 may be coupled with the interface block 245-*a*-1 via a bus 221-*a*-1 and a bus 246-*a*-1, and the interface block 220-*a*-2 may be coupled with the interface block 245-*a*-2 via a bus 221-*a*-2 and a bus 246-*a*-2. In some examples, a die 240 may include a bus that bypasses operational circuitry of the die 240 (e.g., that bypasses interface blocks 245 of a given die 240), such as a bus 255. For example, the interface block 220-*a*-2 may be coupled with the interface block 245-*a*-2 of the die 240-*a*-2 via a bus 255-*a*-1 of the die 240-*a*-1, which may bypass interface blocks 245 of the die 240-*a*-1. Such techniques may be extended for interconnection among more than two dies 240 (e.g., for interconnection via a respective bus 255 of multiple dies 240).

The respective signal paths of buses 221, 246, and 255 may be coupled with one another, from one die to another, via various arrangements of contacts at the surfaces of interfacing dies (e.g., exposed contacts, metal surfaces of the respective dies). For example, the bus 221-*a*-1 may be coupled with the bus 246-*a*-1 via a contact 222-*a*-1 of (e.g., at a surface of) the die 205-*a* and a contact 247-*a*-1 of the die 240-*a*-1, the bus 221-*a*-2 may be coupled with the bus 255-*a*-1 via a contact 222-*a*-2 of the die 205-*a* and a contact 256-*a*-1 of the die 240-*a*-1, the bus 255-*a*-1 may be coupled with the bus 246-*a*-2 via a contact 257-*a*-1 of the die 240-*a*-1 and a contact 247-*a*-2 of the die 240-*a*-2, and so on. Although each respective bus is illustrated with a single line, coupled via singular contacts, it is to be understood that each signal path of a given bus may be associated with respective contacts to support a separate communicative coupling via each signal path of the given bus. In some examples, a bus 255 may traverse a portion of a die 240 (e.g., in an in-plane direction, along a direction different from a thickness direction, in a waterfall arrangement, in a staircase arrangement), which may support an arrangement of contacts 222 along a surface of a die 205, among other contacts, being coupled with interface blocks 245 of different dies 240 along a stack direction (e.g., via respective contacts 256 and 257 that are non-overlapping when viewed along a thickness direction).

The interconnection of interfacing contacts may be supported by various techniques. For example, in a hybrid bonding implementation, interfacing contacts may be coupled by a fusion of conductive materials (e.g., electrically conductive materials) of the interfacing contacts (e.g., without solder or other intervening material between contacts). For example, in an assembled condition, the coupling of the die 205-*a* with the die 240-*a*-1 may include a conductive material of the contact 222-*a*-2 being fused with a conductive material of the contact 256-*a*-1, and the coupling of the die 240-*a*-1 with the die 240-*a*-2 may include a conductive material of the contact 257-*a*-1 being fused with a conductive material of the contact 247-*a*-2, and so on. In some examples, such coupling may include an inoperative fusion of contacts (e.g., a non-communicative coupling, a physical coupling), such as a fusion of the contact 260-*a*-1 with the contact 256-*a*-2, neither of which are coupled with operative circuitry of the dies 240-*a*-1 or 240-*a*-2. In some examples, such techniques may be implemented to improve coupling strength or uniformity (e.g., implementing contacts 260, which may not be operatively coupled with an interface block 245 or an interface block 220), or such a coupling may be a byproduct of a repetition of components that, in various configurations, may be operative or inoperative. (e.g., where, for dies 240 with a common arrangement of contacts 256 and 257, contacts 256-*a*-1 and 257-*a*-1 provide a communicative path between the interface block 245-*a*-2 and the interface block 220-*a*-2, but the contacts 256-*a*-2 and 257-*a*-2 do not provide a communicative path between an interface block 245 and an interface block 220).

In some examples, a fusion of conductive materials between dies (e.g., between contacts) may be accompanied by a fusion of other materials at one or more surfaces of the interfacing dies. For example, in an assembled condition, the coupling of the die 205-*a* with the die 240-*a*-1 may include a dielectric material 207 (e.g., an electrically non-conductive material) of the die 205-*a* being fused with a dielectric material 242 of the die 240-*a*-1, and the coupling of the die 240-*a*-1 with the die 240-*a*-2 may include a dielectric material 242 of the die 240-*a*-1 being fused with a dielectric material 242 of the die 240-*a*-2. In some examples, such dielectric materials may include an oxide, a nitride, a carbide, an oxide-nitride, an oxide-carbide, or other conversion or doping of a substrate material (e.g., a semiconductor substrate material) of the die 205 or dies 240, among other materials that may support such fusion. However, coupling among dies 205 and dies 240 may be implemented in accordance with other techniques, which may implement solder, adhesives, thermal interface materials, and other intervening materials.

In some examples, dies 240 may be coupled in a stack (e.g., forming a "cube" or other arrangement of dies 240), and one or more of such stacks may subsequently be coupled with a die 205. In some examples, respective set(s) of one or more dies 240 may be coupled with each die 205 of multiple dies 205 as formed in a wafer (e.g., in a chip-to-wafer bonding arrangement, before cutting the wafer of dies 205), and the dies 205 of the wafer, each coupled with their respective set(s) of dies 240, may be separated from one another (e.g., by cutting at least the wafer of dies 205). In some other examples, respective set(s) of one or more dies 240 may be coupled with a respective die 205 after the die 205 is separated from a wafer of dies 205 (e.g., in a chip-to-chip bonding arrangement). In some other examples, a respective set of one or more wafers each including multiple dies 240 may be coupled in a stack (e.g., in a wafer-to-wafer bonding arrangement). In various examples, such techniques may be followed by separating stacks of dies 240 from the coupled wafers, or the stack of wafers having dies 240 may be coupled with another wafer including multiple dies 205 (e.g., in a second wafer-to-wafer bonding arrangement), which may be followed by separating systems 200 from the coupled wafers. In some other examples, wafer-to-wafer coupling techniques may be implemented by stacking one or more wafers of dies 240 (e.g., sequentially) over a wafer of dies 205 before separation into systems 200, among other examples for forming systems 200.

The buses 221, 246, and 255 may be implemented to provide a configured signaling (e.g., a coordinated signaling, a logical signaling, modulated signaling, digital signaling) between an interface block 220 and a corresponding interface block 245, which may involve various modulation or encoding techniques by a transmitting interface block (e.g., via a driver component of the transmitting interface block). In some examples, such signaling may be supported by (e.g., accompanied by) clock signaling communicated via the respective buses (e.g., in coordination with signal transmission). For example, the buses may be configured to convey one or more clock signals transmitted by the interface block 220 for reception by the interface block 245 (e.g., to trigger signal reception by a latch or other reception component of the interface block 245, to support clocked operations of the interface block 245). Additionally, or alternatively, the buses may be configured to convey one or more clock signals transmitted by the interface block 245 for reception by the interface block 220 (e.g., to trigger signal reception by a latch or other reception component of the interface block 220, to support clocked operations of the interface block 220). Such clock signals may be associated with the communication (e.g., unidirectional communication, bidirectional communication, deterministic communication) of various signaling, such as control signaling, command signaling, data signaling, or any combination thereof. For example, the buses may include one or more signal paths for communications of a data bus (e.g., one or more data channels, a DQ bus, via a data interface of the interface blocks) in accordance with one or more corresponding clock signals (e.g., data clock signals), or one or more signal paths for communications of a control bus (e.g., a command/address (C/A) bus, via a command interface of the interface blocks) in accordance with one or more clock signals (e.g., control clock signals), or any combination thereof.

Interface blocks 220, interface blocks 245, and logic block 230 each may include circuitry (signaling circuitry, multiplexing circuitry, processing circuitry, controller circuitry, logic circuitry, physical components, hardware) in various configurations (e.g., hardware configurations, logic configurations, software or instruction configurations) that support the functionality allocated to the respective block for accessing or otherwise operating a corresponding set of memory arrays 250. For example, interface blocks 220 may include circuitry configured to perform a first subset of operations that support access of the memory arrays 250, and interface blocks 245 may include circuitry configured to perform a second subset of operations that support access of the memory arrays 250. In some examples, the interface blocks 220 and 245 may support a functional split or distribution of functionality associated with a memory system controller 155, a local memory controller 165, or both across multiple dies (e.g., a die 205 and at least one die 240). In some implementations, a logic block 230 may be configured to coordinate or configure aspects of the operations of the interface blocks 220, of the interface blocks 245, or both, and may support implementing one or more aspects of a memory system controller 155. Such operations, or subsets of operations, may include operations performed in response to commands from the host processor 210 or a controller 215, or operations performed without commands from a host processor 210 or a controller 215 (e.g., operations determined by or initiated by an interface block 220, operations determined by or initiated by an interface block 245, operations determined by or initiated by a logic block 230), or various combinations thereof.

In some implementations, the system 200 may include one or more instances of non-volatile storage (e.g., non-volatile storage 235 of a die 205, non-volatile storage 270 of one or more dies 240, or a combination thereof). In some examples, a logic block 230, interface blocks 220, interface blocks 245, or a combination thereof may be configured to communicate signaling with one or more instances of non-volatile storage. For example, a logic block 230, interface blocks 220, or interface blocks 245 may be coupled with one or more instances of non-volatile storage via one or more buses (not shown), or respective contacts (not shown), where applicable, which may each include one or more signal paths operable to communicate signaling (e.g., command signaling, data signaling). In some examples, a logic block 230, one or more interface blocks 220, one or more interface blocks 245, or a combination thereof may configure one or more operations based on information (e.g., instructions, configurations, parameters) stored in one or more instances of non-volatile storage. Additionally, or alternatively, in some examples, a logic block 230, one or more interface blocks 220, one or more interface blocks 245, or a combination thereof may write information (e.g., configuration information, evaluation information) to be stored in one or more instances of non-volatile storage. In some examples, such non-volatile storage may include fuses, antifuses, or other types of one-time programmable storage elements, or any combination thereof.

In some implementations, the system 200 may include one or more sensors (e.g., one or more sensors 237 of a die 205, one or more sensors 275 of one or more dies 240, or a combination thereof). In some implementations, a logic block 230, interface blocks 220, interface blocks 245, or a combination thereof may be configured to receive one or more indications based on measurements of one or more sensors of the system 200. For example, a logic block 230, interface blocks 220, or interface blocks 245 may be coupled with one or more sensors via one or more buses (not shown), or respective contacts (not shown). Such sensors may include temperature sensors, current sensors, voltage sensors, counters, and other types of sensors. In some examples, a logic block 230, one or more interface blocks 220, one or more interface blocks 245, or a combination thereof may configure one or more operations based on output of the one or more sensors. For example, a logic block 230 may configure one or more operations of interface blocks 220 based on signaling (e.g., indications, data) received from the one or more sensors. Additionally, or alternatively, an interface block 220 may generate access signaling for transmitting to a corresponding interface block 245 based on one or more sensors.

In some examples, circuitry of interface blocks 220, interface blocks 245, or a logic block 230, or any combination thereof may include components (e.g., transistors) formed at least in part from doped portions of a substrate of the respective die. In some examples, a substrate of a die 205 may have characteristics (e.g., materials, material characteristics, physical shapes or dimensions) that are different from those of a substrate of a die 240. Additionally, or alternatively, in some examples, transistors formed from a substrate of a die 205 may have characteristics (e.g., manufacturing characteristics, performance characteristics, physical shapes or dimensions) that are different from transistors formed from a substrate of a die 240 (e.g., in accordance with different transistor architectures, in accordance with different transistor designs).

In some examples, the interface blocks 220 may support a layout for one or more components within the 220. For example, the layout may include pairing components to share an access port (e.g., a command port, a data port). Further, in some examples, the layout may support interfaces for a controller 215 (e.g., a host interface 216) that are different from interfaces for an interface block 245 (e.g., via the buses 221). For instance, a host interface 216 may be synchronous and have separate channels for read and write operations, while an interface between an interface block 220 and one or more interface blocks 245 may be asynchronous and support both read and write operations with the same channel. In some examples, signaling of a host interface 216 may be implemented with a deterministic timing (e.g., deterministic between a controller 215 and one or more interface blocks 220), which may be associated with a configured timing between a first signal and a responsive second signal. In some examples, signaling between an interface block 220 and one or more interface blocks 245 may be implemented with a timing that is different from timing of a host interface 216 (e.g., in accordance with a different clock frequency, in accordance with a timing offset, such as a phase offset), which may be deterministic or non-deterministic.

A die 240 may include one or more units 265 (e.g., modules) that are separated from a semiconductor wafer having a pattern (e.g., a two-dimensional pattern) of units 265. Although each die 240 of the system 200 is illustrated with a single unit 265 (e.g., unit 265-*a*-1 of die 240-*a*-1, unit 265-*a*-2 of die 240-*a*-2), a die 240 in accordance with the described techniques may include any quantity of units 265, which may be arranged in various patterns (e.g., sets of one or more units 265 along a row direction, sets of one or more units 265 along a column direction, among other patterns). Each unit 265 may include at least the circuitry of a respective interface block 245, along with memory array(s) 250, a bus 251, a bus 246, and one or more contacts 247 corresponding to the respective interface block 245. In some examples, where applicable, each unit 265 may also include one or more buses 255, contacts 256, contacts 257, or contacts 260 (e.g., associated with a respective interface block 245 of a unit 265 of a different die 240), which may support various degrees of stackability or modularity among or via units 265 of other dies 240. Although examples of non-volatile storage 270 and sensors 275 are illustrated outside units 265, in some other examples, non-volatile storage 270, sensors 275, or both may additionally, or alternatively, be included in units 265.

In some examples, the interface blocks 220 may include circuitry configured to receive first access command signaling from a host processor 210 or a controller 215 (e.g., via a host interface 216, via one or more contacts 212 from a host processor 210 or controller 215 external to a die 205, based on a request from a host application), and to transmit second access command signaling to the respective (e.g., coupled) interface block 245 based on (e.g., in response to) the received first access command signaling. The interface blocks 245 may accordingly include circuitry configured to receive the second access command signaling from the respective interface block 220 and, in some examples, to access a respective set of one or more memory arrays 250 based on (e.g., in response to) the received second access command signaling. In various examples, the first access command signaling may include access commands that are associated with a type of operation (e.g., a read operation, a write operation, a refresh operation, a memory management operation), which may be associated with an indication of an address of the one or more memory arrays 250 (e.g., a logical address, a physical address). In some examples, the first access command signaling may include an indication of a logical address associated with the memory arrays 250, and circuitry of an interface block 220 may be configured to generate the second access command signaling to indicate a physical address associated with the memory arrays 250 (e.g., a row address, a column address, using a logical-to-physical (L2P) table or other mapping or calculation functionality of the interface block 220).

In some examples, to support write operations of the system 200, circuitry of the interface blocks 220 may be configured to receive (e.g., from a host processor 210, from a controller 215, via a host interface 216, via one or more contacts 212 from a host processor 210 or controller 215 external to a die 205) first data signaling associated with the first access command signaling, and to transmit second data signaling (e.g., associated with second access command signaling) based on received first access command signaling and first data signaling. The interface blocks 245 may accordingly be configured to receive second data signaling, and to write data to one or more memory arrays 250 (e.g., in accordance with an indicated address associated with the first access command signaling) based on the received second access command signaling and second data signaling. In some examples, the interface blocks 220 may include an error control functionality (e.g., error detection circuitry, error correction circuitry, ECC logic, an ECC engine) that supports the interface blocks 220 generating the second data signaling based on performing an error control operation using the received first data signaling (e.g., detecting or correcting an error in the first data signaling, determining one or more parity bits to be conveyed in the second data signaling and written with the data).

In some examples, to support read operations of the system 200, circuitry of the interface blocks 245 may be configured to read data from the memory arrays 250 based on received second access command signaling, and to transmit first data signaling based on the read data. The interface blocks 220 may accordingly be configured to receive first data signaling, and to transmit second data signaling (e.g., to a host processor 210, to a controller 215, via a host interface 216, via one or more contacts 212 to a host processor 210 or controller 215 external to a die 205) based on the received first data signaling. In some examples, the interface blocks 220 may include an error control functionality that supports the interface blocks 220 generating the second data signaling based on performing an error control operation using the received first data signaling (e.g., detecting or correcting an error in the first data signaling, which may include a calculation involving one or more parity bits received with the first data signaling).

In some examples, access command signaling that is transmitted by the interface blocks 220 to the interface blocks 245, among other signaling, may be generated (e.g., based on access command signaling received from a host processor 210, based on initiation signaling received from a host processor 210, without receiving or otherwise independent from signaling from a host processor 210) in accordance with various determination or generation techniques configured at the interface blocks 220 (e.g., based on a configuration for accessing memory arrays 250 that is modified at the interface blocks 220). In some examples, such techniques may involve signaling or other coordination with a logic block 230, a host processor 210, one or more controllers 215, one or more instances of non-volatile storage, one or more sensors, or any combination thereof. Such techniques may support the interface blocks 220 configuring aspects of the access operations performed on the memory arrays 250 by a respective interface block 245, among other operations. For example, interface blocks 220 may include evaluation circuitry, access configuration circuitry, signaling circuitry, scheduling circuitry, repair circuitry, refresh circuitry, error control circuitry, adverse access (e.g., row hammer) mitigation circuitry, and other circuitry operable to configure operations associated with one or more dies (e.g., operations associated with accessing memory arrays 250 of the dies 240).

In accordance with examples described herein, error control functionality of an interface block 220 may be improved by supporting data routing in conjunction with error control operations performed by the interface block 220. For example, an interface block 220 may include logic circuitry operable to route different subsets of data received from an interface block 245 to different error correction engines (e.g., ECC engines) included in the interface block 220. The logic circuitry may route the subsets of data in accordance with a physical arrangement of the memory arrays 250-*a* or associated access circuitry (e.g., of an interface block 245, of an interface block 220), such as a quantity of columns included in a column set (e.g., a column select) of a memory array 250. After the error correction engines perform one or more error control operations on respective subsets of the data, the interface block 220 may combine the subsets of data output from the error correction engines and output (e.g., transmit) the data to a host processor 210 (e.g., via a host interface 216, via a controller 215). Routing data to error correction engines of an interface block 220 in accordance with the techniques described herein may increase a reliability of accessing data stored at a memory array 250, for example, by allocating error correction capabilities in accordance with physical groupings of components that may be more likely to fail concurrently, reducing the likelihood that errors associated with accessing the data are uncorrectable by the error correction engines, among other benefits.

Figure 3:
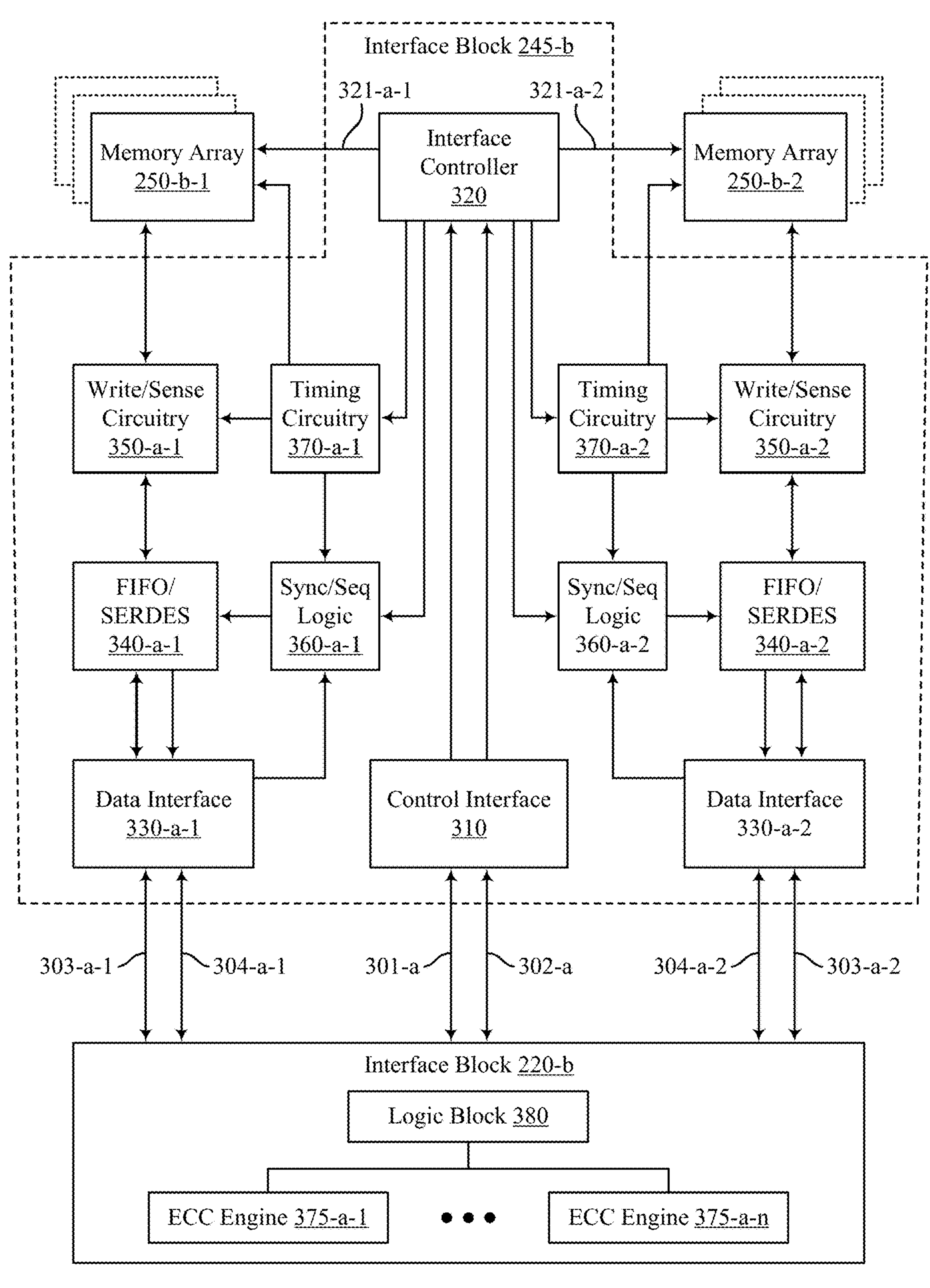
FIG. 3 shows an example of an interface architecture that supports data routing for error correction in stacked memory architectures in accordance with examples as disclosed herein.

FIG. 3 shows an example of an interface architecture 300 that supports data routing for error correction in stacked memory architectures in accordance with examples as disclosed herein. The interface architecture 300 illustrates an example of an interface block 245-*b* (e.g., of a die 240) coupled with an interface block 220-*b* (e.g., of a die 205). The interface block 245-*b* may be communicatively coupled with the interface block 220-*b* via one or more of a bus 301, a bus 302, a bus 303, and a bus 304, each of which may be examples of one or more signal paths of a bus 221 and a bus 246, as well as a bus 255, where applicable.

The interface block 245-*b* includes a control interface 310 (e.g., a command interface), which may be configured to communicate signaling with the interface block 220-*b*. For example, the control interface 310 may include circuitry (e.g., a receiver, one or more latches) configured to receive control signaling (e.g., modulated control signaling, access command signaling, configuration signaling, address signaling, such as row address signaling or column address signaling) via the bus 301-*a*. The control interface 310 also may include circuitry configured to receive clock signaling (e.g., clock signaling associated with the control interface 310, clock signaling having one or more phases, such as true and complement phases, dk_t/c signaling from the interface block 220-*b*) via the bus 302-*a*, which the control interface 310 may use for receiving the control signaling of the bus 301-*a* (e.g., for triggering the one or more latches). The control interface 310 may transmit (e.g., forward) the control signaling and the clock signaling (e.g., for timing of other operations of the interface block 245-*b*) to an interface controller 320.

The interface block 245-*b* also includes two data interfaces 330 (e.g., data interfaces 330-*a*-1 and 330-*a*-2), which also may be configured to communicate signaling with the interface block 220-*b*. Each data interface 330 may include corresponding buses and circuitry, the operation of which may be associated with (e.g., controlled by, coordinated with, operated based on) control signaling via the control interface 310. Although the example of interface block 245-*b* includes two data interfaces 330 associated with the control interface 310 (e.g., in a "channel pair" arrangement, in a "pseudo-channel pair" arrangement), the described techniques for an interface block 245 may include any quantity of one or more data interfaces 330, and associated buses and circuitry, for a given control interface 310 of the interface block 245.

Each data interface 330 may be associated with respective data path circuitry, which may include respective first-in-first-out (FIFO) and serialization/deserialization (SERDES) circuitry (e.g., FIFO/SERDES 340), respective write/sense circuitry 350, respective synchronization and sequencing circuitry (e.g., sync/seq logic 360), and respective timing circuitry 370, along with interconnecting signal paths (e.g., one or more buses). However, in some other examples, data path circuitry may be arranged in a different manner, or may include different circuitry components, which may include circuitry that is dedicated to respective data paths, or shared among data paths, or various combinations thereof. Each data interface 330 also may be associated with a respective set of one or more memory arrays 250. In some examples, each memory array 250 may be understood to include respective addressing circuitry such as bank logic or decoders (e.g., a row decoder, a column decoder), or memory cell sense amplifier circuitry, among other array circuitry. However, in some other examples, at least a portion of such circuitry may be included in an interface block 245.

Each data interface 330 may include circuitry (e.g., one or more latches, one or more drivers) configured to communicate (e.g., receive, transmit) data signaling (e.g., modulated data signaling, DQ signaling) via a respective bus 303. Each data interface 330 also may include circuitry to communicate clock signaling via a respective bus 304, which may support clock signal reception by the data interface 330 (e.g., first clock signaling associated with the data interface 330, clock signaling having one or more phases, such as true and complement phases, DQS t/c signaling from the interface block 220-*b*, clock signaling associated with data reception or write operations), or clock signal transmission by the data interface 330 (e.g., second clock signaling associated with the data interface 330, RDQS_t/c signaling to the interface block 220-*b*, clock signaling associated with data transmission or read operations), or both. In some examples, a data interface 330, a bus 303, or a combination of a bus 303 and a bus 304, may be associated with a "pseudo-channel," and multiple pseudo-channels may be associated with the same control interface 310 or the same control bus (e.g., a bus 301, a combination of a bus 301 and a bus 302). In some implementations, pseudo-channels of multiple interface blocks 245 may be grouped together (e.g., functionally, logically, electrically, such as through hard-wired signal paths or multiplexing circuitry) to support a channel set (e.g., associated with a corresponding host interface 216). Each data interface 330 may transmit clock signaling (e.g., received clock signaling, DQS t/c signaling) to sync/seq logic 360 via a respective bus (e.g., for timing of other operations of the interface block 245-*b*).

The interface controller 320 may support various functionality (e.g., control functionality, configuration functionality) of the interface block 245-*b* for accessing or otherwise managing operations of the coupled memory arrays 250. For example, the interface controller 320 may support access command coordination or configuration, latency or timing compensation, access command buffering (e.g., in accordance with a FIFO or other organizational scheme), mode registers or logic for configuration settings, or test functionality (e.g., evaluation functionality, BIST functionality), among other functions or combinations thereof. For each data path of the interface block 245 (e.g., associated with a respective data interface 330), the interface controller 320 may be configured to transmit signaling (e.g., address signaling, such as row address or row activation signaling) to the respective memory arrays 250 via a bus. For each data path of the interface block 245, the interface controller 320 may communicate signaling (e.g., timing signaling, which may be based on clock signaling received from the control interface 310, configuration signaling) with respective timing circuitry 370 and sync/seq logic 360 via respective buses.

For each data path, the respective timing circuitry 370 may support timing of various operations (e.g., activations, coupling operations, signal latching, signal driving) relative to timing signaling received from the interface controller 320. For example, timing circuitry 370 may include a timing chain (e.g., a global column timing chain) configured to generate one or more clock signals or other initiation signals for controlling operations of the respective data path, and such signaling may include transitions (e.g., rising edge transitions, falling edge transitions, on/off transitions) that are offset from, at a different rate from, or otherwise different from transitions of signaling from the interface controller 320 to support a given operation or combination of operations. For example, timing circuitry 370 may be configured to transmit signaling (e.g., address signaling, such as column address or column activation signaling) to the respective memory arrays 250, to transmit signaling to the respective write/sense circuitry 350 (e.g., latch or driver timing signaling), and to transmit signaling to the respective sync/seq logic (e.g., timing signaling).

For each data path, the respective FIFO/SERDES 340 may be configured to convert between data signaling of a first bus width (e.g., a relatively wide bus width, a data read/write (DRW) bus, a bus for communications with write/sense circuitry 350 having a relatively larger quantity of signal paths) and a second bus width (e.g., a relatively narrow bus width, a bus for communications with a data interface 330 having a relatively smaller quantity of signal paths). In some examples, such a conversion may be accompanied by changing a rate of signaling between signaling from the data interface 330 and the write/sense circuitry 350 (e.g., to maintain a given throughput). In various examples, the FIFO/SERDES 340 may receive data signaling from the data interface 330 and transmit data signaling to the write/sense circuitry 350 (e.g., to support a write operation), or may receive data signaling from the sense circuitry 350 and transmit data signaling to the data interface 330 (e.g., to support a read operation). In some examples (e.g., to support a read operation), the FIFO/SERDES 340 may be configured to transmit clock signaling (e.g., RDQS_t/c signaling) to the data interface 330, which may be forwarded to the interface block 220-*b*.

The timing or other synchronization of operations performed by the FIFO/SERDES 340 may be supported by one or more clock signals, among other signaling, received from the respective sync/seq logic 360. For example, the sync/seq logic 360 may generate or otherwise coordinate clock signaling to support the different rates of signaling of different buses (e.g., based on received clock signaling). Additionally, or alternatively, the FIFO/SERDES 340 may operate in a direction (e.g., for data transmission to a data interface 330, for data reception from a data interface 330) or other mode based on configuration signaling received from the sync/seq logic 360.

For each data path, the respective write/sense circuitry 350 may be configured to support the accessing (e.g., data signaling, write signaling, read signaling) of the respective set of one or more memory arrays 250. For example, the write/sense circuitry 350 may be coupled with the memory arrays 250 via a bus (e.g., a global input/output (GIO) bus), which may include respective signal paths associated with each memory array 250, or may include signal paths that are shared for all of the memory arrays 250 of the set, in which case the memory array circuitry may include multiplexing circuitry operable to couple the bus with a selected one of the memory arrays 250. In some examples, a bus between the write/sense circuitry 350 and the set of one or more memory arrays 250 may include a same quantity of signal paths as a bus between the write/sense circuitry 350 and the FIFO/SERDES 340 (e.g., for signaling GIO[287:0]) or a same quantity of signal paths as a quantity of columns in each memory array 250. In some other examples, the memory arrays 250 may include a quantity of columns that is an integer multiple of the quantity of signal paths of the bus, in which case the memory array circuitry (e.g., each memory array 250) may include decoding circuitry operable to couple a subset of columns of memory cells, or associated circuitry, with the bus.

To support write operations, the write/sense circuitry 350 may be configured to drive signaling that is operable to write one or more logic states to memory cells of the memory arrays 250 (e.g., based on received data, based on received timing signaling, based on data signaling received via a bus 303 and on control signaling received via a bus 301-*a*). In some examples, such signaling may be transmitted to supporting circuitry of or otherwise associated with the memory arrays 250 (e.g., as an output of signals corresponding to logic states to be written), such as sense amplifier circuitry, voltage sources, current sources, or other driver circuitry operable to apply a bias across a storage element of the memory cells (e.g., across a capacitor, across a ferroelectric capacitor), or apply a charge, a current, or other signaling to a storage element of the memory cells (e.g., to apply a current to a chalcogenide or other configurable memory material, to apply a charge to a gate of a NAND memory cell), among other examples.

To support read operations, the write/sense circuitry 350 may be configured to receive signaling that the write/sense circuitry 350 may further amplify for communication through the interface block 245-*b*. For example, the write/sense circuitry 350 may be configured to receive signaling corresponding to logic states read from the memory arrays 250, but at a relatively low driver strength (e.g., relatively ‘analog’ signaling, which may be associated with a relatively low drive strength of sense amplifiers of the memory arrays 250). The write/sense circuitry 350 may thus include further sense amplification (e.g., a data sense amplifier (DSA) between signal paths between the write/sense circuitry and the set of one or more memory arrays and respective signal paths between the write/sense circuitry and the FIFO/SERDES), which each may have a relatively high drive strength (e.g., for driving relatively ‘digital’ signaling).

The features of the interface architecture 300 may be duplicated in various quantities and arrangements to support a semiconductor system having multiple dies, such as various examples of a system 200. In an example implementation, each die 240 may be configured with 64 instances of the interface block 245-*b*, which may support a data signaling width of 9,216 signal paths for each die 240 (e.g., where each bus 303 of a channel pair is associated with 72 signal paths). For a system 200 having a stack of eight dies 240 coupled with a die 205, the die 205 may thus be configured with 512 instances of the interface block 220-*b*, thereby supporting an overall data signaling width of 73,738 signal paths for the system 200. However, in other implementations, dies 205 and dies 240 may be configured with different quantities of interface blocks 220 and 245, respectively, and a system 200 may be configured with different quantities of dies 240 per die 205.

The interface block 220-*b* may support error control for data communicated via one or more buses 303. For example, the interface block 220-*b* may include a set of ECC engines 375-*a* (e.g., ECC engines 375-*a*-1 through 375-*a*-*n*) that are operable to correct one or more bit errors in data received from an interface block 245-*b* (e.g., from one or more data interfaces 330-*a* via one or more buses 303-*a*).

The ECC engines 375-*a* may correct bit errors using an ECC, such as a Reed-Solomon code. Various Reed-Solomon codes may be implemented to support correcting various quantities of bits. For example, a Reed-Solomon code may correct bits in a codeword, where a codeword includes bits organized into data blocks (e.g., data symbols) and parity blocks (e.g., parity symbols). Data blocks may include data bits and parity blocks may include parity bits. A codeword may include n blocks, with k of the n blocks being data blocks and p of the n blocks being parity blocks, where p=n−k. In some examples, the value ofp may also be represented as 2*t*, where t=p/2 and t is the quantity of data blocks (e.g., symbols) of the codeword that may be corrected using the Reed-Solomon code. A Reed-Solomon code may be characterized as an “RS (n, k)” code, which indicates the quantity of blocks n included in a codeword, and the quantity k of blocks of the codeword that are data blocks. For a given block size s (e.g., a quantity of bits included in a block of bits), a maximum codeword length supported by a Reed-Solomon code may be represented as $n=2^s-1$. For example, for a block size of s=8 bits, a maximum value of n supported by a Reed-Solomon code may be 255 blocks.

The interface block 220-*b* may include multiple ECC engines 375-*a*, for example, due to area (e.g., size) and/or performance constraints associated with the ECC engines 375-*a*. For example, ECC engines 375-*a* that implement relatively smaller ECCs (e.g., ECCs for correcting errors in codewords with relatively smaller quantities of symbols) may be relatively smaller and faster than ECC engines 375-*a* that implement relatively larger ECCs. Each ECC engine 375-*a* may be operable to correct a respective quantity of one or more blocks of bits in accordance with an ECC implemented by the ECC engine 375-*a*. In an example, each ECC engine 375-*a* may implement an RS (18, 16) code with a block size of s=8 bits. In such examples, each ECC engine 375-*a* may receive a codeword including 18 blocks, with 16 of the blocks being data blocks and 2 of the blocks being parity blocks. As such, an associated codeword may include 128 bits of data and 16 parity bits, and each ECC engine 375-*a* may be operable to correct bit errors in one of the 16 data blocks.

In accordance with examples described herein, the interface block 220-*b* may support routing subsets of data received from the interface block 245-*b* to different ECC engines 375-*a* to improve error correction functionality of the interface block 220-*b*. For example, the interface block 220-*b* may include a logic block 380. The logic block 380 may route different subsets of the received data to different ECC engines 375-*a*. For example, the logic block 380 may route parity bits corresponding to the subsets of data to corresponding ECC engines 375-*a* such that different codewords are routed to the different ECC engines 375-*a*. Each ECC engine 375-*a* may be operable to correct bit errors in one or more blocks of data of a codeword routed to the ECC engine 375-*a*. As described herein, the logic block 380 may route the subsets of the received data in accordance with a physical arrangement of the memory arrays 250-*b*, or associated access circuitry, such as a quantity of columns of a memory array 250-*b* that are included in a column set of the memory array 250-*b*. For example, signaling for accessing a memory array 250-*b* (e.g., column activation signaling, a column select) may indicate the activation of a set of columns (e.g., a set of digit lines, via write/sense circuitry 350 or FIFO/SERDES 340) of the memory array 250 to access corresponding memory cells. A set of columns activated by a column select command may be referred to as a column set. A column set may include various quantities of columns. For example, different access schemes may include different quantities of columns being activated per column select command. As described herein, different routing schemes of data to ECC engines 375-*a* may be implemented for the different access schemes.

ECC engines 375 may perform one or more error control operations on the respective subsets of the data routed to the ECC engines 375, after which an interface block 220 may combine the subsets of data (e.g., corrected data) output from the ECC engines 375 and may output the combined data to a host processor 210 (e.g., via a host interface 216, via a controller 215). Routing data to ECC engines 375 in accordance with the techniques described herein may increase a reliability of accessing data stored at a memory array 250, for example, by allocating error correction capabilities of ECC engines 375 in accordance with physical groupings of components that may be more likely to fail concurrently, reducing the likelihood that errors associated with accessing the data are uncorrectable by the error correction engines, among other benefits.

Figure 4:
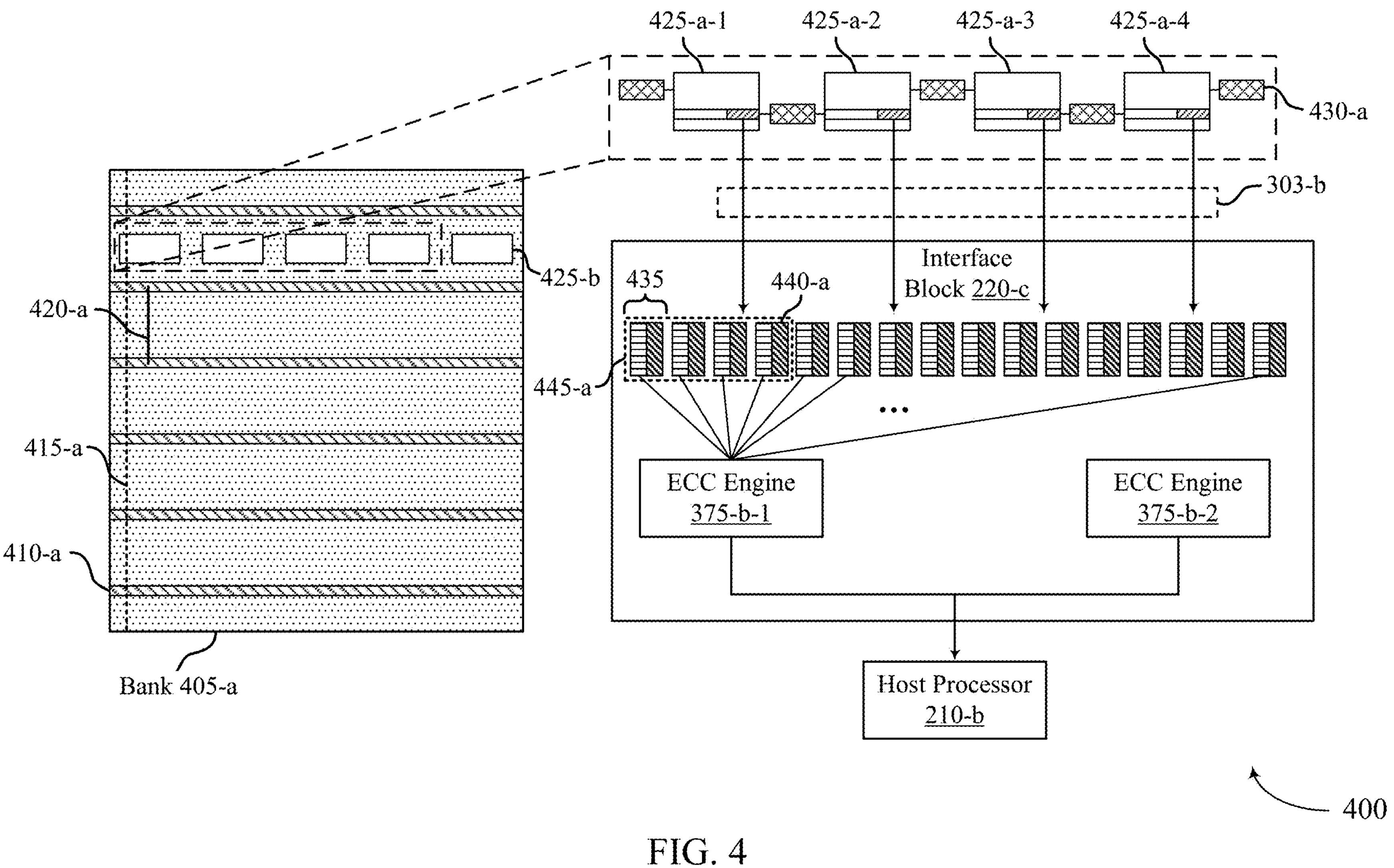
FIGS. 4 and 5 show examples of error control architectures that support data routing for error correction in stacked memory architectures in accordance with examples as disclosed herein.

FIG. 4 shows an example of an error control architecture 400 that supports data routing for error correction in stacked memory architectures in accordance with examples as disclosed herein. The error control architecture 400 may implement or be implemented by aspects of a system 200 and an interface architecture 300 as described with reference to FIGS. 2 and 3. For example, the error control architecture 400 may include an interface block 220-*c* (e.g., of a die 205) that is operable to access a bank 405-*a* (e.g., of a die 240). The bank 405-*a* may include a set of memory cells of a memory array 250 that is accessible via an interface block 245 (e.g., of the die 240). The bank 405-*a* may include access circuitry to support accessing memory cells of the bank 405-*a*. For example, the access circuitry may include one or more sense circuits 410-*a* (e.g., sense amplifiers), one or more global access lines 415-*a* (e.g., of a GIO bus, access lines between a memory array 250 and write/sense circuitry 350), and access lines 420-*a* (e.g., digit lines, column lines), among other access circuitry. The sense circuits 410-*a* may include one or more sense amplifiers coupled with one or more of the global access lines 415-*a* and one or more of the access lines 420-*a*.

In some examples, the sense circuits 410-*a* may divide (e.g., partition) the bank 405-*a* into respective sections of memory cells. Each section of memory cells may include one or more memory cell blocks 425. Each section of memory cells may also include access circuitry for accessing memory cells within the section. For example, a section of memory cells may include word lines and digit lines coupled with rows and columns of memory cells, respectively. A section of memory cells may include one or more word line drivers (e.g., row decoders) used to activate one or more word lines in association with accessing one or more memory cells. For example, a section of memory cells may include one or more drivers 430-*a* coupled with one or more word lines to access memory cells of a memory cell block 425-*a*. In some examples, drivers 430-*a* may be sub-word line drivers (SWDs) used to activate (e.g., bias) one or more word lines coupled with memory cells of one or more adjacent memory cell blocks 425. In some examples, a section of memory cells may include a set of even SWDs for activating even word lines of the section of memory cells and a set of odd SWDs for activating odd word lines of the section of memory cells.

In some examples, different memory cell blocks 425 may be configured to store different types of information. For example, a memory cell block 425-*a* may be configured to store data, and a memory cell block 425-*b* may be configured to store ECC information, such as parity bits corresponding to data stored in memory cell blocks 425-*a*. Other memory cell blocks 425 configured to store other types of information are possible.

Data may be read (e.g., retrieved) from multiple memory cell blocks 425-*a* as part of a read operation of the bank 405-*a*. For example, as part of a read operation, the interface block 220-*c* may read a set of data from the bank 405-*a*. The set of data may include subsets of data 445-*a* that are stored in physical groupings at a bank 405-*a*, such as respective memory cell blocks 425-*a*. For example, the set of data may include respective subsets of data 445-*a* stored at memory cell blocks 425-*a*-1 through 425-*a*-4. Each subset of data 445-*a* may include a set of blocks 440-*a*, where each block 440-*a* may include a set of bits. The quantity of bits in a block 440-*a* may correspond to a block size s (e.g., a symbol size) of an ECC implemented by ECC engines 375-*b* of the interface block 220-*c*.

The blocks 440-*a* may be organized (e.g., physically, logically) into pairs 435 of blocks 440-*a* in accordance with a quantity of columns included in a column set of a memory cell block 425-*a*. For instance, in the example of error control architecture 400, a column set may include twice the quantity of columns as the quantity of bits included in a block 440-*a*. As such, a pair 435 of blocks 440-*a* may be read from a memory cell block 425-*a* for each column select command issued to read data from the memory cell block 425-*a*. In some examples, multiple column select commands may be issued to read a respective subset of data 445-*a*. For example, a subset of data 445-*a* may include four pairs 435 of blocks 440-*a* (e.g., among other possible quantities of pairs 435) that are read based on four respective column select commands. In some examples, each block 440-*a* may correspond to a contiguous set of columns of the memory cell block 425-*a* (e.g., of the bank 405-*a*, of a memory array 250). For example, the bits included in a block 440-*a* may be read using a contiguous set of columns (e.g., digit lines). In some examples, columns included in a column set may be contiguous (e.g., physically contiguous) columns. In some examples, columns from which a subset of data 445-*a* is read may be contiguous columns.

The interface block 220-*c* may receive the set of data (e.g., the blocks 440-*a*) via one or more buses 303 (e.g., bus 303-*b*). In some examples, the set of data may be received as a set of bursts communicated via the bus 303-*b*. For example, a quantity of signal paths of the bus 303-*b* (e.g., a quantity of contacts 222 and contacts 256) may be less than a quantity of bits of the set of data. As such, multiple bursts of the set of data (e.g., a portion of each of the subsets of data 445-*a*) may be sequentially transmitted to the interface block 220-*c* via the bus 303-*b* (e.g., until the entire set of data is transmitted to the interface block 220-*c*). In some examples, each memory cell block 425-*a* may be associated with a respective subset of the signal paths of the bus 303-*b*. For example, data from the memory block 425-*a*-1 may be transmitted to the interface block 220-*c* via a first subset of the signal paths, and so on.

In an example, a read operation may include reading 256 bits of data from the memory cell blocks 425-*a* (e.g., and 32 parity bits from one or more memory cell blocks 425-*b*). The 256 bits of data may be read from the four memory cell blocks 425-*a*-1 through 425-*a*-4 with 64 bits of data being read from each memory cell block 425-*a*. Each block 440-*a* may include 8 bits (e.g., corresponding to 8 contiguous columns), and each column set may include 16 columns (e.g., 16 contiguous columns). Accordingly, four column select commands for each memory cell block 425-*a* may be issued to read the respective 64 bits of data. The bus 303-*b* may include 64 signal paths via which the 256 bits of data may be transmitted to the interface block 220-*c* (e.g., a 8 signal paths via which the parity bits may be transmitted). As such, the 256 bits of data may be transmitted in four bursts of 64 bits of data each. Different subsets of the 64 signal paths may be used to read data from different memory cell blocks 425-*a*. For example, signal paths 0-15 may be used to read data from the memory cell block 425-*a*-1, signal paths 16-31 may be used to read data from the memory cell block 425-*a*-2, signal paths 32-47 may be used to read data from the memory cell block 425-*a*-3, and signal paths 48-63 may be used to read data from the memory cell block 425-*a*-4. As such, the 64 bits of data read from memory cell block 425-*a*-1 may be transmitted to the interface block 220-*c* in four bursts of 16 bits each via the signal paths 0-15, and so on.

The interface block 220-*c* may route the received set of data to the ECC engines 375-*b* in accordance with a quantity of columns included in a column set (e.g., a quantity of blocks 440-*a* corresponding to a column set). For instance, in the example of error control architecture 400, the interface block 220-*c* may include an ECC engine 375-*b*-1 and an ECC engine 375-*b*-2, and each column set may correspond to a pair 435 of blocks 440-*a* (e.g., two blocks 440-*a*). The interface block 220-*c* (e.g., a logic block 380 of the interface block 220-*c*) may route a first block 440-*a* of each pair 435 to the ECC engine 375-*b*-1 and a second block 440-*a* of each pair 435 to the ECC engine 375-*b*-2. As such, the blocks 440-*a* of each pair 435 may be split and routed to different ECC engines 375-*b* of the interface block 220-*c*.

In some examples, the interface block 220-*c* may route parity bits to the ECC engines 375-*b* in accordance with the routing of the blocks 440-*a*. For example, a logic block 380 may route parity bits corresponding to the respective first blocks 440-*a* of each pair 435 to the ECC engine 375-*b*-1 and route parity bits corresponding to the respective second blocks 440-*a* of each pair 435 to the ECC engine 375-*b*-2.

The ECC engines 375-*b*-1 and 375-*b*-2 may perform one or more error control operations on the respective blocks 440-*a* routed to the ECC engines 375-*b*. For example, the ECC engines 375-*b*-1 and 375-*b*-2 may perform one or more error detection operations on the respective blocks 440-*a* (e.g., using the respective parity bits routed to the ECC engines 375-*b*) to detect whether there are bit errors associated with the respective blocks 440-*a*. If one or more bit errors are detected, the ECC engines 375-*b*-1 and 375-*b*-2 may perform one or more error correction operations on the respective blocks 440-*a* to correct the one or more bit errors (e.g., if correctable by an ECC implemented by the ECC engines 375-*b*).

The ECC engines 375-*b*-1 may output data of the respective blocks 440-*a* (e.g., corrected data) after performing the one or more error control operations. The interface block 220-*c* may combine the data output from each of the ECC engines 375-*b* and output the combined data to a host processor 210-*b* (e.g., via a host interface 216, via a controller 215). The interface block 220-*c* may combine the data output from the ECC engines 375-*b* such that the data output to the host processor 210-*c* is received in a correct order for the host processor 210-*b* to interpret the data. For example, the interface block 220-*c* may combine the blocks 440-*a* back into their corresponding pairs 435 and then output the blocks 440-*a* to the host processor 210-*b*.

By splitting and routing the blocks 440-*a* of each pair 435 to different ECC engines 375-*b*, error correction functionality of the interface block 220-*c* may be improved. For example, in the example of error control architecture 400, such routing may ensure that bit errors in one column set (e.g., a single column set) may be corrected by the ECC engines 375-*b*. For instance, errors associated with a column set may result in bit errors in both blocks 440-*a* of a pair. If each ECC engine 375-*b* is operable to correct bit errors in a single block 440-*a*, splitting the blocks 440-*a* of the pair may enable each ECC engine 375-*b* to correct the respective bit errors in each block 440-*a* such that the bit errors may be corrected. If both blocks 440-*a* of each pair 435 were instead routed to the same ECC engine 375-*b*, errors associated with a column set may result in an uncorrectable error (e.g., due to the presence of bit errors in more than one block 440-*a* routed to the same ECC engine 375-*b*).

Additionally, or alternatively, in the example of error control architecture 400, such routing may ensure that bit errors associated with (e.g., up to) two adjacent pairs of signal paths of the bus 303-*b* may be corrected by the ECC engines 375-*b*. For example, the bits of block 440-*a* may be transmitted to the interface block 220-*c* via two adjacent signal paths (such as in four bursts of two bits each). If each ECC engine 375-*b* is operable to correct bit errors in a single block 440-*a*, the ECC engine 375-*b*-1 may correct bit errors in one (e.g., a single) respective first block 440-*a* of the pairs 435, and the ECC engine 375-*b*-2 may correct bit errors in one (e.g., a single) respective second block 440-*a* of the pairs 435. As such, the ECC engine 375-*b*-1 may correct bit errors associated with a first adjacent pair of signal paths via which the respective first block 440-*a* is transmitted, the ECC engine 375-*b*-2 may correct bit errors associated with a second adjacent pair of signal paths via which the respective second block 440-*a* is transmitted, or a combination thereof.

Figure 5:
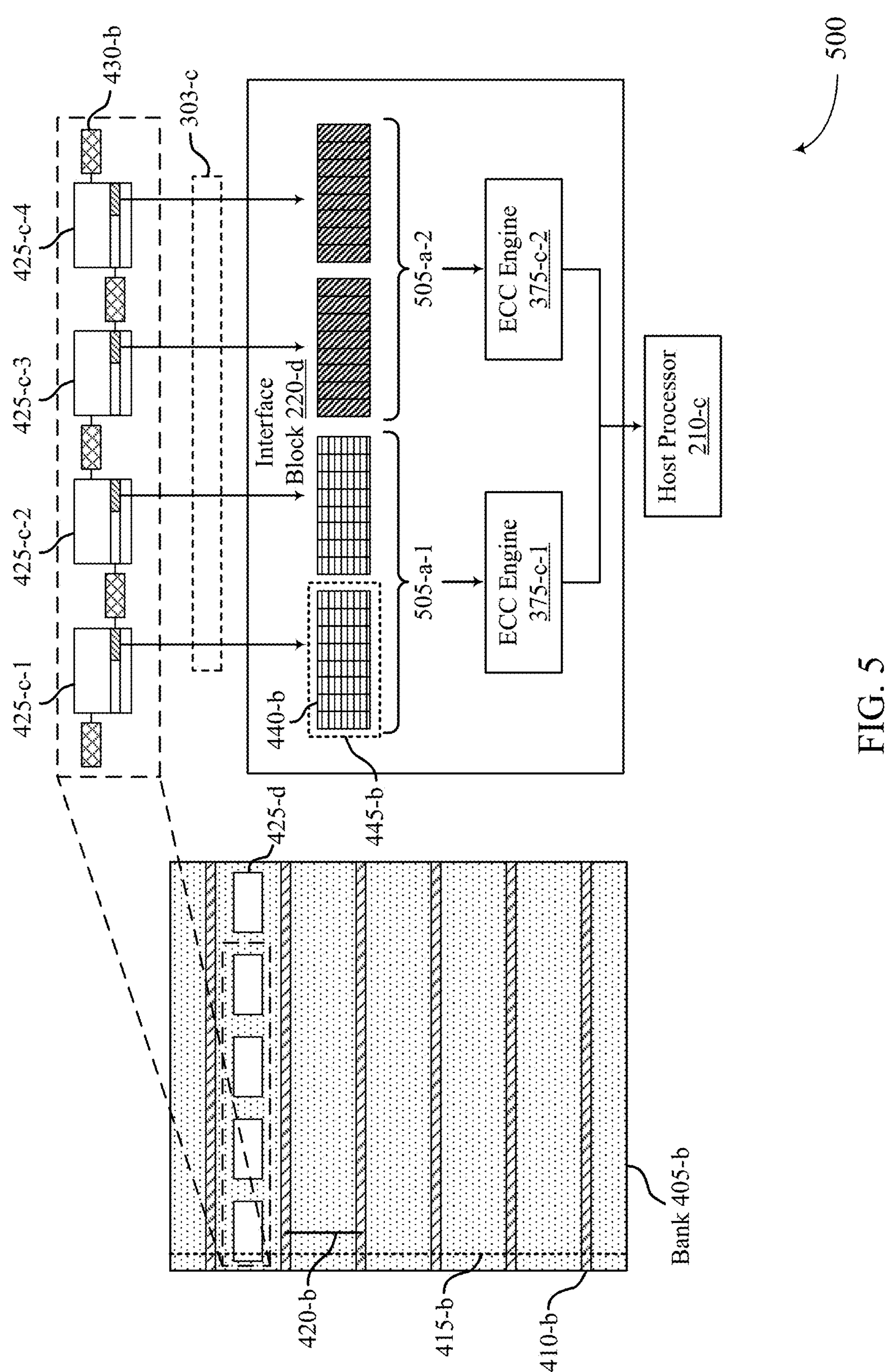

FIG. 5 shows an example of an error control architecture 500 that supports data routing for error correction in stacked memory architectures in accordance with examples as disclosed herein. The error control architecture 500 may implement or be implemented by aspects of a system 200 and an interface architecture 300 as described with reference to FIGS. 2 and 3. For example, the error control architecture 500 may include an interface block 220-*d* (e.g., of a die 205) that is operable to access a bank 405-*b* (e.g., of a memory array 250 of a die 240). The bank 405-*b* may include access circuitry, such as one or more sense circuits 410-*b* (e.g., sense amplifiers), one or more global access lines 415-*b* (e.g., of a GIO bus), and access lines 420-*b* (e.g., digit lines, column lines), and drivers 430-*b* (among other access circuitry) to support accessing memory cells of memory cell blocks 425. In some examples, a section of memory cells of the bank 405-*b* may include a set of memory cell blocks 425, which may be configured to store various types of information. For example, a section of memory cells may include one or more memory cell blocks 425-*c* configured to store data, and one or more memory cell blocks 425-*d* configured to store ECC information (e.g., parity bits), among other types of information.

Data may be read from multiple memory cell blocks 425-*c* as part of a read operation of the bank 405-*b*. For example, as part of a read operation, the interface block 220-*d* may read a set of data from the bank 405-*b*. The set of data may include subsets of data 445-*b* that are stored in respective memory cell blocks 425-*c*. For example, the set of data may include respective subsets of data 445-*b* stored at memory cell blocks 425-*c*-1 through 425-*c*-4. Each subset of data 445-*b* may include a set of blocks 440-*b*. In the example of error control architecture 500, a quantity of columns of a column set of a memory cell block 425-*c* may equal to quantity of bits included in a block 440-*b*. As such, a single block 440-*b* may be read from a memory cell block 425-*c* for each column select command issued to read data from the memory cell block 425-*c*.

The interface block 220-*d* may receive the set of data (e.g., the blocks 440-*b*) via signal paths of one or more buses 303 (e.g., a bus 303-*c*). In some examples, the set of data may be received as a set of bursts communicated via the bus 303-*c*. For example, a quantity of signal paths of the bus 303-*c* (e.g., a quantity of contacts 222 and contacts 256) may be less than a quantity of bits of the set of data. As such, multiple bursts of the set of data (e.g., a portion of each of the subsets of data 445-*b*) may be sequentially transmitted to the interface block 220-*d* via the bus 303-*c*.

The interface block 220-*d* may route the received set of data to ECC engines 375-*c* of the interface block 220-*d* in accordance with a quantity of columns included in a column set (e.g., a quantity of blocks 440-*b* corresponding to a column set). For instance, in the example of FIG. 5, the interface block 220-*d* may include an ECC engine 375-*c*-1 and an ECC engine 375-*c*-2, and each column set may correspond to a single block 440-*b*. The interface block 220-*d* (e.g., a logic block 380 of the interface block 220-*d*) may route different subsets 505-*a* of the blocks 440-*b* to different ECC engines 375-*c*. For example, the logic block 380 may route a subset 505-*a*-1 of the blocks 440-*b* to the ECC engine 375-*c*-1 and a subset 505-*a*-2 of the blocks 440-*b* to the ECC engine 375-*b*-2. The subset 505-*a*-1 may include blocks 440-*b* that include a first subset of data 445-*b* read from the memory cell block 425-*c*-1 and a second subset of data 445-*b* read from the memory cell block 425-*c*-2. The subset 505-*a*-2 may include blocks 440-*b* that include a third subset of data 445-*b* read from the memory cell block 425-*c*-3 and a fourth subset of data 445-*b* read from the memory cell block 425-*c*-4.

In some examples, each block 440-*b* (e.g., and thus each column set) may correspond to a contiguous (e.g., physically contiguous) set of columns of a memory cell block 425-*c*. In some examples, columns from which a subset of data 445-*b* is read may be contiguous columns. As such, data included in the subset 505-*a*-1 may correspond to a first subset of contiguous columns corresponding to the first subset of data 445-*b* and a second subset of contiguous columns corresponding to the second subset of data 445-*b*. Data included in the subset 505-*a*-2 may correspond to a third subset of contiguous columns corresponding to the third subset of data 445-*b* and a fourth subset of contiguous columns corresponding to the fourth subset of data 445-*b*. In some examples, the logic block 380 may route the received set of data such that a first subset of data received via a first subset of signal paths of the bus 303-*c* (e.g., a first half of the signal paths) are routed to the ECC engine 375-*c*-1 and a second subset of data received via a second subset of signal paths of the bus 303-*c* (e.g., a second half of the signal paths) are routed to the ECC engine 375-*c*-2. For example, the data included in the subset 505-*a*-1 may be received via the first subset of signal paths, and data included in the subset 505-*a*-2 may be received via the second subset of signal paths. In some examples, the first subset of signal paths are contiguous signal paths of the bus 303-*c*, and the second subset of signal paths are contiguous signal paths of the bus 303-*c*.

In some examples, the interface block 220-*d* may route parity bits to the ECC engines 375-*c* in accordance with the routing of the blocks 440-*b*. For example, a logic block 380 may route parity bits corresponding to the data of the subset 505-*a*-1 to the ECC engine 375-*b*-1 and route parity bits corresponding to data of the subset 505-*a*-2 to the ECC engine 375-*b*-2.

The ECC engines 375-*c*-1 and 375-*c*-2 may perform one or more error control operations on the respective blocks 440-*b* routed to the ECC engines 375-*c*. For example, the ECC engines 375-*c*-1 and 375-*c*-2 may perform one or more error detection operations on the respective blocks 440-*a* (e.g., using the respective parity bits routed to the ECC engines 375-*c*) to detect whether there are bit errors associated with the respective blocks 440-*b*. If one or more bit errors are detected, the ECC engines 375-*c*-1 and 375-*c*-2 may perform one or more error correction operations on the respective blocks 440-*b* to correct the one or more bit errors (e.g., if correctable by an ECC implemented by the ECC engines 375-*c*).

The ECC engines 375-*c*-1 may output data of the respective blocks 440-*b* (e.g., corrected data) after performing the one or more error control operations. The interface block 220-*d* may combine the data output from each of the ECC engines 375-*c* and output the combined data to a host processor 210-*c*.

By routing the subsets 505-*a* of blocks 440-*b* to different ECC engines 375-*c*, error correction functionality of the interface block 220-*d* may be improved. For example, in the example of error control architecture 500, such routing may ensure that bit errors in (e.g., up to) two column sets may be corrected by the ECC engines 375-*c*. For instance, errors associated with a column set may result in bit errors in a corresponding block 440-*b*. If each ECC engine 375-*c* is operable to correct bit errors in a single block 440-*b*, each ECC engine 375-*c* may be operable to correct bit errors in one of the blocks 440-*b* routed to the ECC engine 375-*c*.

Additionally, or alternatively, in the example of error control architecture 500, such routing may ensure that bit errors associated with (e.g., up to) two adjacent pairs of signal paths of the bus 303-*c* may be corrected by the ECC engines 375-*c*. For example, the bits of block 440-*b* may be transmitted to the interface block 220-*d* via two adjacent signal paths (such as in four bursts of two bits each). If each ECC engine 375-*c* is operable to correct bit errors in a single block 440-*b*, the ECC engine 375-*c*-1 may correct bit errors in one (e.g., a single) block 440-*b* of the subset 505-*a*-1, and the ECC engine 375-*c*-2 may correct bit errors in one (e.g., a single) block 440-*b* of the subset 505-*a*-2. As such, the ECC engine 375-*c*-1 may correct bit errors associated with a first adjacent pair of signal paths via which the block 440-*b* of the subset 505-*a*-1 is transmitted, the ECC engine 375-*c*-2 may correct bit errors associated with a second adjacent pair of signal paths via which the block 440-*b* of the subset 505-*a*-2 is transmitted, or a combination thereof.

Although illustrated as separate examples, in some implementations, a system 200 may support both the error control architecture 400 and the error control architecture 500. In some implementations, a system 200 may be configured to perform the error control architecture 400 or the error control architecture 500 based on a relative likelihood of one type of physically-grouped error or another, which may be associated with a selection during manufacturing or evaluation, or based on a determination performed at the system 200 (e.g., by a logic block 230). In some implementations, such a selection may be performed separately for each interface block 220 of the system, which may be based on access patterns, data patterns, or performance characteristics of the respective interface blocks 220, or various other criteria. Thus, in accordance with these and other examples, a system 200 may support increased reliability of accessing data stored at a memory array 250, for example, by allocating error correction capabilities of ECC engines 375 in accordance with physical groupings of components that may be more likely to fail concurrently, reducing the likelihood that errors associated with accessing the data are uncorrectable by the error correction engines, among other benefits.

Figure 6:
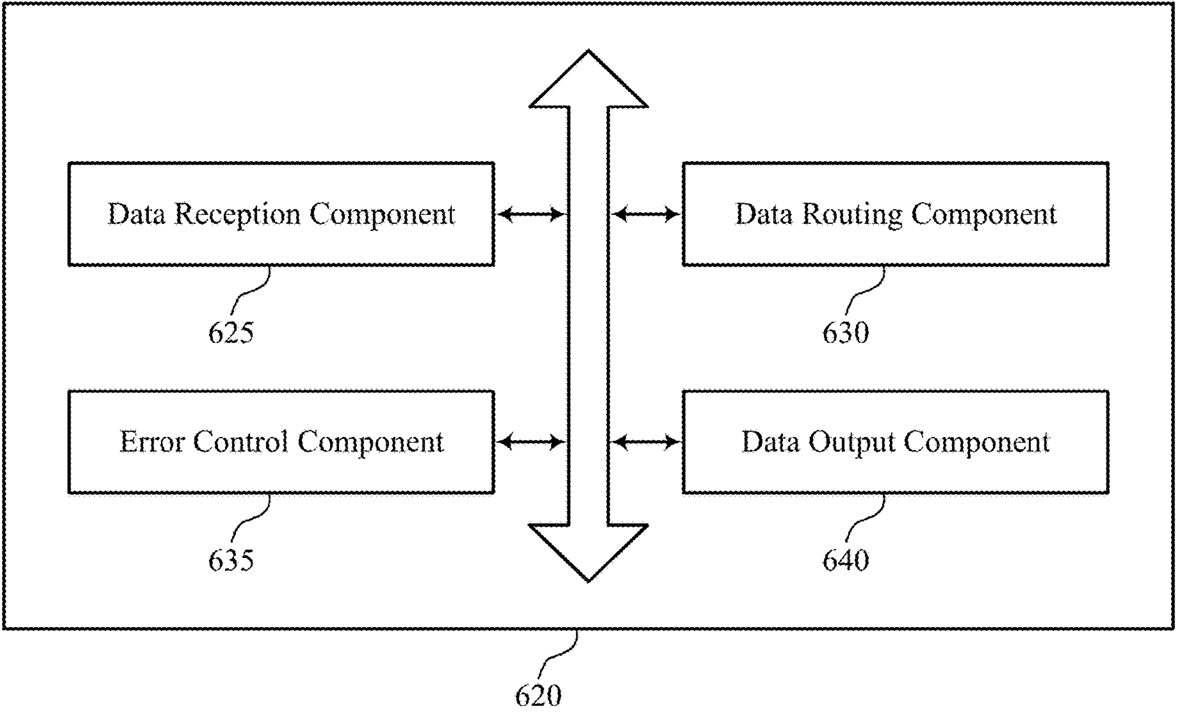
FIG. 6 shows a block diagram of a logic die that supports data routing for error correction in stacked memory architectures in accordance with examples as disclosed herein.
Figure 6:

FIG. 6 shows a block diagram 600 of a logic die 620 that supports data routing for error correction in stacked memory architectures in accordance with examples as disclosed herein. The logic die 620 may be an example of aspects of a logic die (e.g., a die 205) as described with reference to FIGS. 1 through 5. The logic die 620, or various components thereof (e.g., an interface block 220, circuitry of the interface block 220), may be an example of means for performing various aspects of data routing for error correction in stacked memory architectures as described herein. For example, the logic die 620 (e.g., an interface block 220) may include a data reception component 625, a data routing component 630, an error control component 635, a data output component 640, or any combination thereof. Each of these components, or components of subcomponents thereof (e.g., one or more processors, one or more memories), may communicate, directly or indirectly, with one another (e.g., via one or more buses).

In some examples, the data reception component 625 may be configured as or otherwise support a means for receiving, from a first semiconductor die (e.g., a die 240, an array die) by an interface (e.g., an interface block 220) of a second semiconductor die (e.g., the logic die 620, a die 205), data including pairs of blocks of bits, each pair of blocks (e.g., pairs 435 of blocks 440) corresponding to a respective column set of one or more memory arrays (e.g., memory arrays 250) of the first semiconductor die. The data routing component 630 may be configured as or otherwise support a means for routing, at the interface, a first block of each pair of blocks to a first error correction engine (e.g., a first ECC engine 375) of the interface and a second block of each pair of blocks to a second error correction engine (e.g., a second ECC engine 375) of the interface. The error control component 635 (e.g., including the first and second ECC engines 375) may be configured as or otherwise support a means for performing, based on the routing, one or more error control operations on the pairs of blocks using the first error correction engine and the second error correction engine. The data output component 640 may be configured as or otherwise support a means for outputting the data from the interface (e.g., via a host interface 216) after performing the one or more error control operations.

In some examples, the data output component 640 may be configured as or otherwise support a means for combining, after performing the one or more error control operations, the first block of each pair of blocks with the second block of each pair of blocks, and the data may be output based on the combining.

In some examples, to support performing the one or more error control operations, the error control component 635 may be configured as or otherwise support a means for performing one or more error detection operations, one or more error correction operations, or a combination thereof.

In some examples, to support performing the one or more error correction operations, the error control component 635 may be configured as or otherwise support a means for correcting, based on the routing, bit errors in one column set of a plurality of column sets from which the data is received.

In some examples, to support performing the one or more error correction operations, the error control component 635 may be configured as or otherwise support a means for correcting, based on the routing, bit errors in one respective first block using the first error correction engine, one respective second block using the second error correction engine, or a combination thereof.

In some examples, each column set includes a respective set of contiguous columns of the one or more memory arrays. In some examples, each block of bits of a respective pair of blocks corresponds to a respective subset of contiguous columns of the respective set of contiguous columns. In some examples, the respective sets of contiguous columns include sixteen columns, and the respective subsets of contiguous columns include eight columns.

Additionally, or alternatively, the data reception component 625 may be configured as or otherwise support a means for receiving, from a first semiconductor die (e.g., a die 240, an array die) by an interface (e.g., an interface block 220) of a second semiconductor die (e.g., the logic die 620, a die 205), data including a set of blocks of bits (e.g., a set of blocks 440), each block corresponding to a respective column set of one or more memory arrays (e.g., memory arrays 250) of the first semiconductor die. In some examples, the data routing component 630 may be configured as or otherwise support a means for routing, at the second interface, a first subset of blocks (e.g., a first subset of blocks 505) of the set of blocks to a first error correction engine (e.g., a first ECC engine 375) of the interface and a second subset of blocks (e.g., a second subset of blocks 505) of the set of blocks to a second error correction engine (e.g., a second ECC engine 375) of the interface, the first subset of blocks corresponding to one or more first subsets of contiguous columns of the one or more memory arrays, the second subset of blocks corresponding to one or more second subsets of contiguous columns of the one or more memory arrays. In some examples, the error control component 635 may be configured as or otherwise support a means for performing, based on the routing, one or more error control operations on the set of blocks using the first error correction engine and the second error correction engine. In some examples, the data output component 640 may be configured as or otherwise support a means for outputting the data from the interface after performing the one or more error control operations.

In some examples, the data output component 640 may be configured as or otherwise support a means for combining, after performing the one or more error control operations, the first subset of blocks from the first error correction engine with the second subset of blocks from the second error correction engine, and the data may be output based on the combining.

In some examples, to support performing the one or more error control operations, the error control component 635 may be configured as or otherwise support a means for performing one or more error detection operations, one or more error correction operations, or a combination thereof.

In some examples, to support performing the one or more error correction operations, the error control component 635 may be configured as or otherwise support a means for correcting, based on the routing, bit errors in one column set of a plurality of column sets from which the data is received using the first error correction engine, one other column set of the plurality of column sets using the second error correction engine, or a combination thereof.

In some examples, to support performing the one or more error correction operations, the error control component 635 may be configured as or otherwise support a means for correcting, based on the routing, bit errors in one block of the first subset of blocks using the first error correction engine, one block of the second subset of blocks using the second error correction engine, or a combination thereof.

In some examples, the respective subset of contiguous columns corresponding to the first subset is contiguous with the respective subset of contiguous columns corresponding to the second subset.

In some examples, each column set includes a respective set of contiguous columns of the one or more memory arrays. In some examples, the respective sets of contiguous columns include eight columns.

In some examples, the described functionality of the logic die 620, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the logic die 620, or various components thereof, may be implemented at least in part by instructions (e.g., stored in memory, non-transitory computer-readable medium) executable by such at least one processor.

Figure 7:
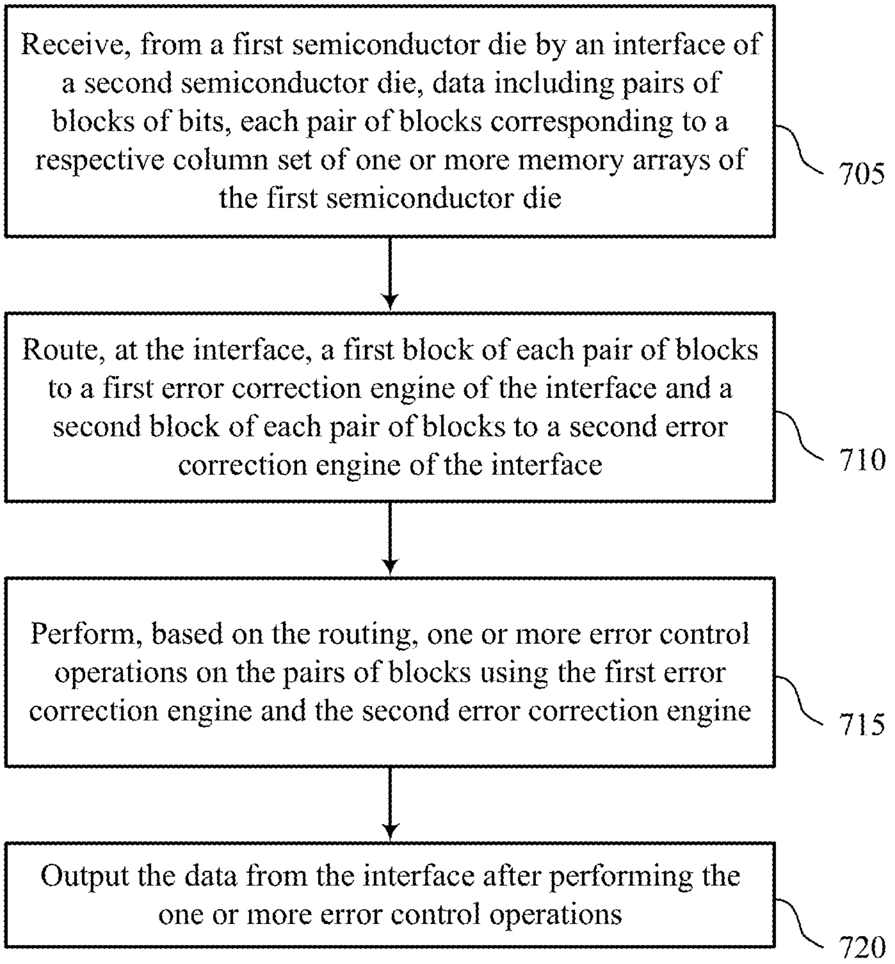
FIGS. 7 and 8 show flowcharts illustrating methods that support data routing for error correction in stacked memory architectures in accordance with examples as disclosed herein.

FIG. 7 shows a flowchart illustrating a method 700 that supports data routing for error correction in stacked memory architectures in accordance with examples as disclosed herein. The operations of method 700 may be implemented by a logic die (e.g., a die 205) or its components as described herein (e.g., an interface block 220). For example, the operations of method 700 may be performed by a logic die as described with reference to FIGS. 1 through 6. In some examples, a logic die may execute a set of instructions to control the functional elements of the device to perform the described functions. Additionally, or alternatively, the logic die may perform aspects of the described functions using special-purpose hardware.

At 705, the method may include receiving, from a first semiconductor die by an interface of a second semiconductor die, data including pairs of blocks of bits, each pair of blocks corresponding to a respective column set of one or more memory arrays of the first semiconductor die. For example, a die 205 may include an interface block 220 that receives data from a die 240. The data may include pairs 435 of blocks 440, and each pair 435 of blocks 440 may correspond to a respective column set of one or more memory arrays 250 of the die 240. In some examples, aspects of the operations of 705 may be performed by a data reception component 625 as described with reference to FIG. 6.

At 710, the method may include routing, at the interface, a first block of each pair of blocks to a first error correction engine of the interface and a second block of each pair of blocks to a second error correction engine of the interface. For example, the interface block 220 may route (e.g., using a logic block 380) a first block 440 of each pair 435 of blocks 440 to a first ECC engine 375 and a second block 440 of each pair 435 of blocks 440 to a second ECC engine 375. In some examples, aspects of the operations of 710 may be performed by a data routing component 630 as described with reference to FIG. 6.

At 715, the method may include performing, based on the routing, one or more error control operations on the pairs of blocks using the first error correction engine and the second error correction engine. For example, the first and second ECC engines 375 may perform one or more error control operations on the pairs 435 of blocks 440. In some examples, aspects of the operations of 715 may be performed by an error control component 635 as described with reference to FIG. 6.

At 720, the method may include outputting the data from the interface after performing the one or more error control operations. For example, the interface block 220 may output the data (e.g., to a host processor 210) after the first and second ECC engines 375 perform the one or more error control operations. In some examples, aspects of the operations of 720 may be performed by a data output component 640 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, from a first semiconductor die by an interface of a second semiconductor die, data including pairs of blocks of bits, each pair of blocks corresponding to a respective column set of one or more memory arrays of the first semiconductor die; routing, at the interface, a first block of each pair of blocks to a first error correction engine of the interface and a second block of each pair of blocks to a second error correction engine of the interface; performing, based on the routing, one or more error control operations on the pairs of blocks using the first error correction engine and the second error correction engine; and outputting the data from the interface after performing the one or more error control operations.

Aspect 2: The method, apparatus, or non-transitory computer-readable medium of aspect 1, further including operations, features, circuitry, logic, means, or instructions, or any combination thereof for combining, after performing the one or more error control operations, the first block of each pair of blocks with the second block of each pair of blocks, where the data is output based on the combining.

Aspect 3: The method, apparatus, or non-transitory computer-readable medium of any of aspects 1 through 2, where performing the one or more error control operations includes operations, features, circuitry, logic, means, or instructions, or any combination thereof for performing one or more error detection operations, one or more error correction operations, or a combination thereof.

Aspect 4: The method, apparatus, or non-transitory computer-readable medium of aspect 3, where performing the one or more error correction operations includes operations, features, circuitry, logic, means, or instructions, or any combination thereof for correcting, based on the routing, bit errors in one column set of a plurality of column sets from which the data is received.

Aspect 5: The method, apparatus, or non-transitory computer-readable medium of any of aspects 3 through 4, where performing the one or more error correction operations includes operations, features, circuitry, logic, means, or instructions, or any combination thereof for correcting, based on the routing, bit errors in one respective first block using the first error correction engine, one respective second block using the second error correction engine, or a combination thereof.

Aspect 6: The method, apparatus, or non-transitory computer-readable medium of any of aspects 1 through 5, where each column set includes a respective set of contiguous columns of the one or more memory arrays and each block of bits of a respective pair of blocks corresponds to a respective subset of contiguous columns of the respective set of contiguous columns.

Aspect 7: The method, apparatus, or non-transitory computer-readable medium of aspect 6, where the respective sets of contiguous columns include sixteen columns and the respective subsets of contiguous columns include eight columns.

Figure 8:
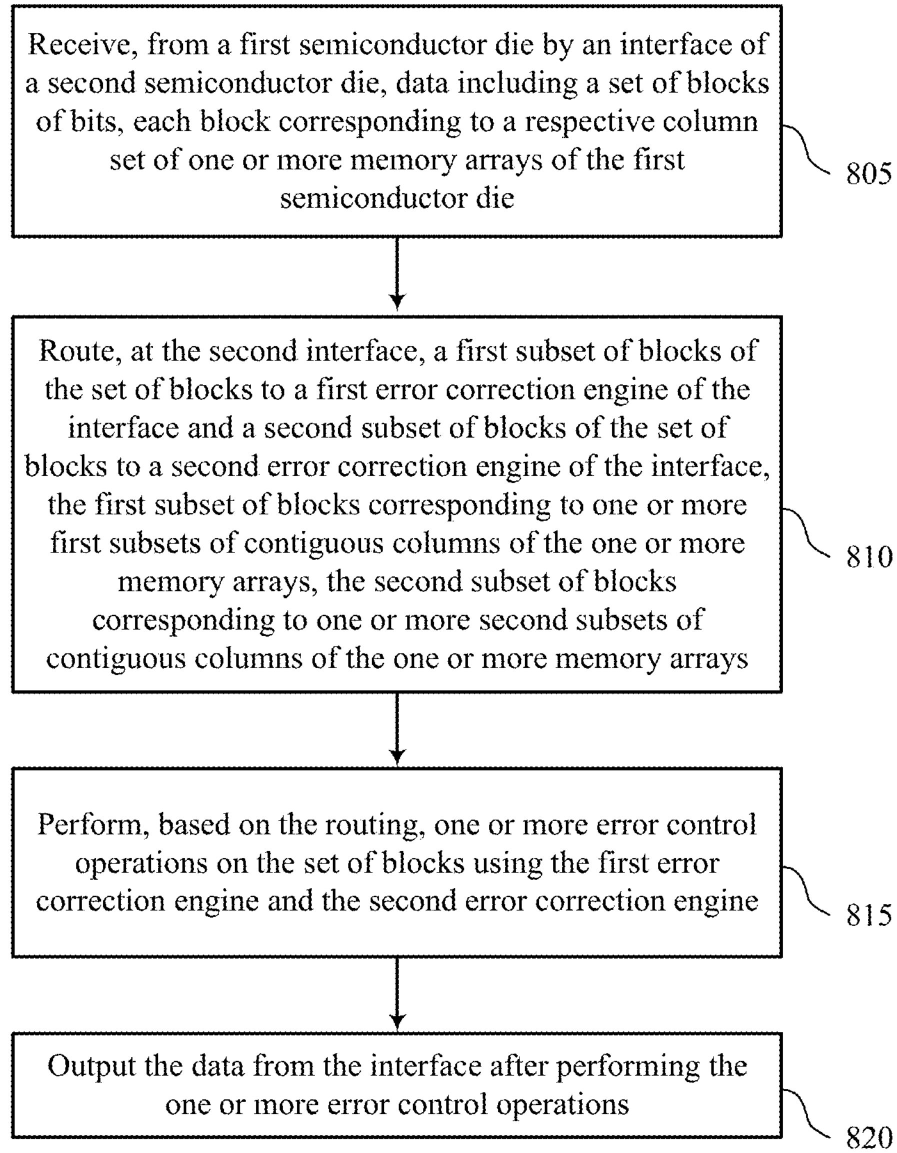

FIG. 8 shows a flowchart illustrating a method 800 that supports data routing for error correction in stacked memory architectures in accordance with examples as disclosed herein. The operations of method 800 may be implemented by a logic die (e.g., a die 205) or its components as described herein (e.g., an interface block 220). For example, the operations of method 800 may be performed by a logic die as described with reference to FIGS. 1 through 6. In some examples, a logic die may execute a set of instructions to control the functional elements of the device to perform the described functions. Additionally, or alternatively, the logic die may perform aspects of the described functions using special-purpose hardware.

At 805, the method may include receiving, from a first semiconductor die by an interface of a second semiconductor die, data including a set of blocks of bits, each block corresponding to a respective column set of one or more memory arrays of the first semiconductor die. For example, a die 205 may include an interface block 220 that receives data from a die 240. The data may include a set of blocks 440, and each block 440 of the set of blocks 440 may correspond to a respective column set of one or more memory arrays 250 of the die 240. In some examples, aspects of the operations of 805 may be performed by a data reception component 625 as described with reference to FIG. 6.

At 810, the method may include routing, at the second interface, a first subset of blocks of the set of blocks to a first error correction engine of the interface and a second subset of blocks of the set of blocks to a second error correction engine of the interface, the first subset of blocks corresponding to one or more first subsets of contiguous columns of the one or more memory arrays, the second subset of blocks corresponding to one or more second subsets of contiguous columns of the one or more memory arrays. For example, the interface block 220 may route (e.g., using a logic block 380) a first subset of blocks 505 of the set of blocks 440 to a first ECC engine 375 and a second subset of blocks 505 of the set of blocks 440 to a second ECC engine 375. The first subset and the second subset In some examples, aspects of the operations of 810 may be performed by a data routing component 630 as described with reference to FIG. 6.

At 815, the method may include performing, based on the routing, one or more error control operations on the set of blocks using the first error correction engine and the second error correction engine. For example, the first and second ECC engines 375 may perform one or more error control operations on the set of blocks 440. In some examples, aspects of the operations of 815 may be performed by an error control component 635 as described with reference to FIG. 6.

At 820, the method may include outputting the data from the interface after performing the one or more error control operations. For example, the interface block 220 may output the data (e.g., to a host processor 210) after the first and second ECC engines 375 perform the one or more error control operations. In some examples, aspects of the operations of 820 may be performed by a data output component 640 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 8: A method, apparatus, or non-transitory computer-readable medium including operations, features, circuitry, logic, means, or instructions, or any combination thereof for receiving, from a first semiconductor die by an interface of a second semiconductor die, data including a set of blocks of bits, each block corresponding to a respective column set of one or more memory arrays of the first semiconductor die; routing, at the second interface, a first subset of blocks of the set of blocks to a first error correction engine of the interface and a second subset of blocks of the set of blocks to a second error correction engine of the interface, the first subset of blocks corresponding to one or more first subsets of contiguous columns of the one or more memory arrays, the second subset of blocks corresponding to one or more second subsets of contiguous columns of the one or more memory arrays; performing, based on the routing, one or more error control operations on the set of blocks using the first error correction engine and the second error correction engine; and outputting the data from the interface after performing the one or more error control operations.

Aspect 9: The method, apparatus, or non-transitory computer-readable medium of aspect 8, further including operations, features, circuitry, logic, means, or instructions, or any combination thereof for combining, after performing the one or more error control operations, the first subset of blocks from the first error correction engine with the second subset of blocks from the second error correction engine, where the data is output based on the combining.

Aspect 10: The method, apparatus, or non-transitory computer-readable medium of any of aspects 8 through 9, where performing the one or more error control operations includes operations, features, circuitry, logic, means, or instructions, or any combination thereof for performing one or more error detection operations, one or more error correction operations, or a combination thereof.

Aspect 11: The method, apparatus, or non-transitory computer-readable medium of aspect 10, where performing the one or more error correction operations includes operations, features, circuitry, logic, means, or instructions, or any combination thereof for correcting, based on the routing, bit errors in one column set of a plurality of column sets from which the data is received using the first error correction engine, one other column set of the plurality of column sets using the second error correction engine, or a combination thereof.

Aspect 12: The method, apparatus, or non-transitory computer-readable medium of any of aspects 10 through 11, where performing the one or more error correction operations includes operations, features, circuitry, logic, means, or instructions, or any combination thereof for correcting, based on the routing, bit errors in one block of the first subset of blocks using the first error correction engine, one block of the second subset of blocks using the second error correction engine, or a combination thereof.

Aspect 13: The method, apparatus, or non-transitory computer-readable medium of any of aspects 8 through 12, where the respective subset of contiguous columns corresponding to the first subset is contiguous with the respective subset of contiguous columns corresponding to the second subset.

Aspect 14: The method, apparatus, or non-transitory computer-readable medium of any of aspects 8 through 13, where each column set includes a respective set of contiguous columns of the one or more memory arrays.

Aspect 15: The method, apparatus, or non-transitory computer-readable medium of aspect 14, where the respective sets of contiguous columns include eight columns.

It should be noted that the aspects described herein describe possible implementations, and that the operations and the steps may be rearranged or otherwise modified and that other implementations are possible. Further, portions from two or more of the methods may be combined.

A system is described. The following provides an overview of aspects of the apparatus as described herein:

Aspect 16: A system, including: one or more first semiconductor dies including: one or more memory arrays; and one or more first interfaces each including first circuitry operable to access at least one corresponding memory array of the one or more memory arrays; and a second semiconductor die coupled with the one or more first semiconductor dies, the second semiconductor die including: one or more second interfaces, each second interface including: a plurality of error correction engines each operable to correct one or more bit errors; second circuitry operable to receive data, from a respective first interface, stored at a corresponding memory array; and logic circuitry operable to route a first subset of the received data to a first error correction engine of the plurality of error correction engines and a second subset of the received data to a second error correction engine of the plurality of error correction engines.

Aspect 17: The system of aspect 16, where, to route the first subset of the received data and the second subset of the received data, the logic circuitry is operable to: route a first set of columns of one or more memory arrays to the first error correction engine and a second set of columns of the one or more memory arrays to the second error correction engine.

Aspect 18: The system of any of aspects 16 through 17, where the data includes pairs of blocks of bits, each pair of blocks corresponding to a respective column set of the one or more memory arrays, and where, to route the first subset of the received data and the second subset of the received data, the logic circuitry is operable to: route a first block of each pair of blocks to the first error correction engine and a second block of each pair of blocks to the second error correction engine.

Aspect 19: The system of aspect 18, where, based on the routing, the plurality of error correction engines are operable to correct bit errors in one column set of a plurality of column sets from which the data is received.

Aspect 20: The system of any of aspects 18 through 19, where: each column set includes a respective set of contiguous columns of the one or more memory arrays, and each block of bits of a respective pair of blocks corresponds to a respective subset of contiguous columns of the respective set of contiguous columns.

Aspect 21: The system of aspect 20, where: the respective sets of contiguous columns include sixteen columns, and the respective subsets of contiguous columns include eight columns.

Aspect 22: The system of any of aspects 16 through 17, where the data includes a set of blocks of bits, each block corresponding to a respective column set of the one or more memory arrays, and where, to route the first subset of the received data and the second subset of the received data, the logic circuitry is operable to: route a first subset of blocks of the set of blocks to the first error correction engine and a second subset of blocks of the set of blocks to the second error correction engine.

Aspect 23: The system of aspect 22, where, based on the routing, the plurality of error correction engines are operable to correct bit errors in two column sets of a plurality of column sets from which the data is received.

Aspect 24: The system of any of aspects 22 through 23, where the first subset of blocks corresponds to one or more first subsets of contiguous columns of the one or more memory arrays, and wherein the second subset of blocks corresponds to one or more second subsets of contiguous columns of the one or more memory arrays.

Aspect 25: The system of any of aspects 22 through 24, where each column set includes a respective set of contiguous columns of the one or more memory arrays.

Aspect 26: The system of aspect 25, where the respective sets of contiguous columns include eight columns.

Aspect 27: The system of any of aspects 16 through 26, where: the second circuitry is operable to receive the data using a plurality of contacts that are coupled between the one or more first semiconductors dies and the second semiconductor die, and based on the routing, the plurality of error correction engines are operable to correct bit errors in two adjacent pairs of contacts of the plurality of contacts.

Aspect 28: The system of any of aspects 16 through 27, where the plurality of error correction engines are operable to perform one or more error control operations on the received data, the one or more error control operations including one or more error detection operations, one or more error correction operations, or a combination thereof.

An apparatus is described. The following provides an overview of aspects of the apparatus as described herein:

Aspect 29: An apparatus, including: a second semiconductor die including an interface, the interface including circuitry operable to: receive, from a first semiconductor die coupled with the second semiconductor die, data including pairs of blocks of bits, to a respective column set of one or more memory arrays of the first semiconductor die; route a first block of each pair of blocks to a first error correction engine of the interface and a second block of each pair of blocks to a second error correction engine of the interface; perform, based on the routing, one or more error control operations on the pairs of blocks using the first error correction engine and the second error correction engine; and output the data after performing the one or more error control operations.

An apparatus is described. The following provides an overview of aspects of the apparatus as described herein:

Aspect 30: An apparatus, including: a second semiconductor die including an interface, the interface including circuitry operable to: receive, from a first semiconductor die coupled with the second semiconductor die, data including a set of blocks of bits, each block corresponding to a respective column set of one or more memory arrays of the first semiconductor die; route a first subset of blocks of the set of blocks to a first error correction engine of the interface and a second subset of blocks of the set of blocks to a second error correction engine of the interface, the first subset and the second subset each corresponding to a respective subset of contiguous columns of the one or more memory arrays; perform, based on the routing, one or more error control operations on the set of blocks using the first error correction engine and the second error correction engine; and output the data after performing the one or more error control operations.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. A conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or may be an indirect conductive path that includes intermediate components, such as switches, transistors, or other components. In some examples, the flow of signals between the connected components may be interrupted for a time, for example, using one or more intermediate components such as switches or transistors.

The term "isolated" may refer to a relationship between components in which signals are not presently capable of flowing between the components. Components are isolated from each other if there is an open circuit between them. For example, two components separated by a switch that is positioned between the components are isolated from each other when the switch is open. When a component isolates two components, the component may initiate a change that prevents signals from flowing between the other components using a conductive path that previously permitted signals to flow.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component may initiate a change that allows signals to flow between the other components over a conductive path that previously did not permit signals to flow.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Similar components may be distinguished by following the reference label by one or more dashes and additional labeling that distinguishes among the similar components. If just the first reference label is used in the specification, the description is applicable to any one of the similar components having the same first reference label irrespective of the additional reference labels.

The functions described herein may be implemented in hardware, software executed by a processing system (e.g., one or more processors, one or more controllers, control circuitry processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processor. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, that can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or a processor.

The descriptions and drawings are provided to enable a person having ordinary skill in the art to make or use the disclosure. Various modifications to the disclosure will be apparent to the person having ordinary skill in the art, and the techniques disclosed herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A system, comprising:

one or more first semiconductor dies comprising:

one or more memory arrays; and one or more first interfaces each comprising first circuitry operable to access at least one corresponding memory array of the one or more memory arrays; and a second semiconductor die coupled with the one or more first semiconductor dies, the second semiconductor die comprising:

one or more second interfaces, each second interface comprising:

a plurality of error correction engines each operable to correct one or more bit errors;

second circuitry operable to receive data, from a respective first interface, stored at a corresponding memory array, wherein the data comprises pairs of blocks of bits, each pair of blocks corresponding to a respective column set of the one or more memory arrays of a first semiconductor die of the one or more first semiconductor dies; and logic circuitry operable to route a first block of each pair of blocks to a first error correction engine of the plurality of error correction engines and a second block of each pair of blocks to a second error correction engine of the plurality of error correction engines.

2. The system of claim 1, wherein, to route the first block of each pair of blocks and the second block of each pair of blocks, the logic circuitry is operable to:

route a first set of columns of one or more memory arrays to the first error correction engine and a second set of columns of the one or more memory arrays to the second error correction engine.

3. The system of claim 1, wherein, based on the routing, the plurality of error correction engines are operable to correct bit errors in one column set of a plurality of column sets from which the data is received.

4. The system of claim 1, wherein:

each column set comprises a respective set of contiguous columns of the one or more memory arrays, and each block of bits of a respective pair of blocks corresponds to a respective subset of contiguous columns of the respective set of contiguous columns.

5. The system of claim 4, wherein:

the respective sets of contiguous columns comprise sixteen columns, and the respective subsets of contiguous columns comprise eight columns.

6. The system of claim 1, wherein the data comprises a set of blocks of bits, each block corresponding to a respective column set of the one or more memory arrays, and wherein, to route the first block of each pair of blocks and the second block of each pair of blocks, the logic circuitry is operable to:

route a first subset of blocks of the set of blocks to the first error correction engine and a second subset of blocks of the set of blocks to the second error correction engine.

7. The system of claim 6, wherein, based on the routing, the plurality of error correction engines are operable to correct bit errors in two column sets of a plurality of column sets from which the data is received.

8. The system of claim 6, wherein the first subset and the second subset each correspond to a respective subset of contiguous columns of the one or more memory arrays.

9. The system of claim 6, wherein each column set comprises a respective set of contiguous columns of the one or more memory arrays.

10. The system of claim 6, wherein the respective sets of contiguous columns comprise eight columns.

11. The system of claim 1, wherein:

the second circuitry is operable to receive the data using a plurality of contacts that are coupled between the one or more first semiconductors dies and the second semiconductor die, and based on the routing, the plurality of error correction engines are operable to correct bit errors in two adjacent pairs of contacts of the plurality of contacts.

12. The system of claim 1, wherein the plurality of error correction engines are operable to perform one or more error control operations on the received data, the one or more error control operations comprising one or more error detection operations, one or more error correction operations, or a combination thereof.

13. A method, comprising:

receiving, from a first semiconductor die by an interface of a second semiconductor die, data comprising pairs of blocks of bits, each pair of blocks corresponding to a respective column set of one or more memory arrays of the first semiconductor die;

routing, at the interface, a first block of each pair of blocks to a first error correction engine of the interface and a second block of each pair of blocks to a second error correction engine of the interface;

performing, based on the routing, one or more error control operations on the pairs of blocks using the first error correction engine and the second error correction engine; and outputting the data from the interface after performing the one or more error control operations.

14. The method of claim 13, further comprising:

combining, after performing the one or more error control operations, the first block of each pair of blocks with the second block of each pair of blocks, wherein the data is output based on the combining.

15. The method of claim 13, wherein performing the one or more error control operations comprises:

performing one or more error detection operations, one or more error correction operations, or a combination thereof.

16. The method of claim 15, wherein performing the one or more error correction operations comprises:

correcting, based on the routing, bit errors in one column set of a plurality of column sets from which the data is received.

17. The method of claim 15, wherein performing the one or more error correction operations comprises:

correcting, based on the routing, bit errors in one respective first block using the first error correction engine, one respective second block using the second error correction engine, or a combination thereof.

18. The method of claim 13, wherein:

each column set comprises a respective set of contiguous columns of the one or more memory arrays, and each block of bits of a respective pair of blocks corresponds to a respective subset of contiguous columns of the respective set of contiguous columns.

19. The method of claim 18, wherein:

the respective sets of contiguous columns comprise sixteen columns, and the respective subsets of contiguous columns comprise eight columns.

20. A system, comprising:

a second semiconductor die comprising an interface, the interface comprising circuitry operable to:

receive, from a first semiconductor die coupled with the second semiconductor die, data comprising pairs of blocks of bits, to a respective column set of one or more memory arrays of the first semiconductor die;

route a first block of each pair of blocks to a first error correction engine of the interface and a second block of each pair of blocks to a second error correction engine of the interface;

perform, based on the routing, one or more error control operations on the pairs of blocks using the first error correction engine and the second error correction engine; and output the data after performing the one or more error control operations.

21. A method, comprising:

receiving, from a first semiconductor die by an interface of a second semiconductor die, data comprising a set of blocks of bits, each block corresponding to a respective column set of one or more memory arrays of the first semiconductor die;

routing, at the second interface, a first subset of blocks of the set of blocks to a first error correction engine of the interface and a second subset of blocks of the set of blocks to a second error correction engine of the interface, the first subset of blocks corresponding to one or more first subsets of contiguous columns of the one or more memory arrays, the second subset of blocks corresponding to one or more second subsets of contiguous columns of the one or more memory arrays;

performing, based on the routing, one or more error control operations on the set of blocks using the first error correction engine and the second error correction engine; and outputting the data from the interface after performing the one or more error control operations.

22. The method of claim 21, further comprising:

combining, after performing the one or more error control operations, the first subset of blocks from the first error correction engine with the second subset of blocks from the second error correction engine, wherein the data is output based on the combining.

23. The method of claim 21, wherein performing the one or more error control operations comprises:

performing one or more error detection operations, one or more error correction operations, or a combination thereof.

24. The method of claim 23, wherein performing the one or more error correction operations comprises:

correcting, based on the routing, bit errors in one column set of a plurality of column sets from which the data is received using the first error correction engine, one other column set of the plurality of column sets using the second error correction engine, or a combination thereof.

25. The method of claim 23, wherein performing the one or more error correction operations comprises:

correcting, based on the routing, bit errors in one block of the first subset of blocks using the first error correction engine, one block of the second subset of blocks using the second error correction engine, or a combination thereof.

26. The method of claim 21, wherein the respective subset of contiguous columns corresponding to the first subset is contiguous with the respective subset of contiguous columns corresponding to the second subset.

27. The method of claim 21, wherein each column set comprises a respective set of contiguous columns of the one or more memory arrays.

28. The method of claim 27, wherein the respective sets of contiguous columns comprise eight columns.

29. A system, comprising:

a second semiconductor die comprising an interface, the interface comprising circuitry operable to:

receive, from a first semiconductor die coupled with the second semiconductor die, data comprising a set of blocks of bits, each block corresponding to a respective column set of one or more memory arrays of the first semiconductor die;

route a first subset of blocks of the set of blocks to a first error correction engine of the interface and a second subset of blocks of the set of blocks to a second error correction engine of the interface, the first subset and the second subset each corresponding to a respective subset of contiguous columns of the one or more memory arrays;

perform, based on the routing, one or more error control operations on the set of blocks using the first error correction engine and the second error correction engine; and output the data after performing the one or more error control operations.

* * * * *